United States Patent
Finnerty et al.

(10) Patent No.: US 10,364,150 B2
(45) Date of Patent: Jul. 30, 2019

(54) DUEL UTILIZATION LIQUID AND GASEOUS FUEL REFORMER AND METHOD OF REFORMING

(71) Applicant: Watt Fuel Cell Corp., Mount Pleasant, PA (US)

(72) Inventors: Caine M. Finnerty, Port Washington, NY (US); Paul DeWald, Scottdale, PA (US)

(73) Assignee: WATT Fuel Cell Corp., Mount Pleasant, PA (US)

( * ) Notice: Subject to any disclaimer, the term of this patent is extended or adjusted under 35 U.S.C. 154(b) by 0 days.

(21) Appl. No.: 15/034,000

(22) PCT Filed: Nov. 6, 2014

(86) PCT No.: PCT/US2014/064362
§ 371 (c)(1),
(2) Date: May 3, 2016

(87) PCT Pub. No.: WO2015/069907
PCT Pub. Date: May 14, 2015

(65) Prior Publication Data
US 2016/0280540 A1   Sep. 29, 2016

Related U.S. Application Data

(60) Provisional application No. 61/900,510, filed on Nov. 6, 2013, provisional application No. 61/900,543, filed on Nov. 6, 2013.

(51) Int. Cl.
*B01J 4/00* (2006.01)
*B01J 7/00* (2006.01)
(Continued)

(52) U.S. Cl.
CPC ........... *C01B 3/386* (2013.01); *B01J 4/001* (2013.01); *B01J 4/002* (2013.01); *B01J 4/005* (2013.01);
(Continued)

(58) Field of Classification Search
CPC .................................................. C01B 3/00
See application file for complete search history.

(56) References Cited

U.S. PATENT DOCUMENTS 2,945,077 A   7/1960   Polk
3,516,284 A   6/1970   Foster
(Continued)

FOREIGN PATENT DOCUMENTS

EP   1382382 A1   1/2004
EP   1787950 A2   5/2007
(Continued)

OTHER PUBLICATIONS

C. Finnerty, K. Kendall, G. A. Tompsett, Integrated Catalytic Burner/Micro-SOFC Design and Applications Electrochemistry, 68 (2) (2000) 519-521.
(Continued)

*Primary Examiner* — Matthew J Merkling
(74) *Attorney, Agent, or Firm* — Dilworth & Barrese, LLP

(57) ABSTRACT

A dual utilization liquid and gaseous fuel CPOX reformer that includes reaction zones for the CPOX reforming of liquid and gaseous reformable fuels. A reforming method is also provided. The method comprises reforming a first gaseous reformable reaction mixture comprising oxygen-containing gas and vaporized liquid fuel and before or after this step, reforming second gaseous reformable reaction mixture comprising oxygen-containing gas and gaseous fuel to produce a hydrogen-rich reformate.

21 Claims, 10 Drawing Sheets

(51) Int. Cl.
*B01J 8/02* (2006.01)
*B01J 8/06* (2006.01)
*B01J 8/18* (2006.01)
*B01J 8/24* (2006.01)
*C01B 3/38* (2006.01)
*B01J 12/00* (2006.01)
*B01J 19/00* (2006.01)
*B01J 19/24* (2006.01)

(52) U.S. Cl.
CPC .............. *B01J 7/00* (2013.01); *B01J 8/0285* (2013.01); *B01J 8/065* (2013.01); *B01J 8/067* (2013.01); *B01J 8/1836* (2013.01); *B01J 8/24* (2013.01); *B01J 12/005* (2013.01); *B01J 12/007* (2013.01); *B01J 19/0013* (2013.01); *B01J 19/0093* (2013.01); *B01J 19/2415* (2013.01); *B01J 19/2445* (2013.01); *B01J 2208/00389* (2013.01); *B01J 2208/00902* (2013.01); *B01J 2208/00911* (2013.01); *B01J 2219/002* (2013.01); *B01J 2219/00006* (2013.01); *B01J 2219/00058* (2013.01); *B01J 2219/00063* (2013.01); *B01J 2219/00069* (2013.01); *B01J 2219/00117* (2013.01); *B01J 2219/00132* (2013.01); *B01J 2219/00135* (2013.01); *B01J 2219/00155* (2013.01); *B01J 2219/00157* (2013.01); *B01J 2219/00159* (2013.01); *B01J 2219/00213* (2013.01); *B01J 2219/00234* (2013.01); *B01J 2219/00585* (2013.01); *C01B 2203/0233* (2013.01); *C01B 2203/0244* (2013.01); *C01B 2203/0261* (2013.01); *C01B 2203/085* (2013.01); *C01B 2203/0844* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01); *C01B 2203/141* (2013.01)

(56) References Cited

U.S. PATENT DOCUMENTS

| | | |
|---|---|---|
| 3,560,167 A | 2/1971 | Bruckner et al. |
| 4,588,659 A | 5/1986 | Abens et al. |
| 4,751,057 A | 6/1988 | Westerman |
| 4,894,205 A | 1/1990 | Westerman et al. |
| 5,149,156 A | 9/1992 | Kleefeldt |
| 5,149,516 A | 9/1992 | Han et al. |
| 5,447,705 A | 9/1995 | Petit et al. |
| 5,527,631 A | 6/1996 | Singh et al. |
| 5,573,737 A | 11/1996 | Balachandrean et al. |
| 5,596,514 A | 1/1997 | Maher, Jr. et al. |
| 5,648,582 A | 7/1997 | Schmidt et al. |
| 5,690,763 A | 11/1997 | Ashmead et al. |
| 6,033,793 A | 3/2000 | Woods et al. |
| 6,284,398 B1 | 9/2001 | Kiryu |
| 6,296,814 B1 | 10/2001 | Bonk et al. |
| 6,379,586 B1 | 4/2002 | Zeng et al. |
| 6,383,469 B1 | 5/2002 | Lamla et al. |
| 6,383,670 B1 | 5/2002 | Edlund et al. |
| 6,402,989 B1 | 6/2002 | Gaffney |
| 6,403,049 B1 | 6/2002 | Van Keulen et al. |
| 6,447,940 B1 | 9/2002 | Ueda |
| 6,458,334 B1 | 10/2002 | Tamhankar et al. |
| 6,465,118 B1 | 10/2002 | Dickman et al. |
| 6,488,838 B1 | 12/2002 | Tonkovich et al. |
| 6,488,907 B1 | 12/2002 | Barnes et al. |
| 6,492,050 B1 | 12/2002 | Sammes |
| 6,521,204 B1 | 2/2003 | Borup et al. |
| 6,565,817 B1 | 5/2003 | Kiryu |
| 6,576,359 B2 | 6/2003 | Fronk |
| 6,585,940 B2 | 6/2003 | Abe et al. |
| 6,641,625 B1 | 11/2003 | Clawson et al. |
| 6,641,795 B2 | 11/2003 | Abe |
| 6,656,623 B2 | 12/2003 | Holmes et al. |
| 6,667,123 B2 | 12/2003 | Yu |
| 6,673,270 B1 | 1/2004 | De Jong et al. |
| 6,692,707 B1 | 2/2004 | Hirabayashi |
| 6,699,609 B2 | 3/2004 | Kotani et al. |
| 6,702,960 B1 | 3/2004 | Schaddenhorst et al. |
| 6,726,853 B2 | 4/2004 | Okado et al. |
| 6,749,958 B2 | 6/2004 | Pastula et al. |
| 6,770,106 B1 | 8/2004 | Okamoto et al. |
| 6,783,742 B2 | 8/2004 | Bentley et al. |
| 6,790,247 B2 | 9/2004 | Childress et al. |
| 6,790,431 B2 | 9/2004 | Wang et al. |
| 6,800,387 B2 | 10/2004 | Shimada et al. |
| 6,833,208 B2 | 12/2004 | Kotani et al. |
| 6,833,536 B2 | 12/2004 | Shigeura |
| 6,869,456 B2 | 3/2005 | Salemi et al. |
| 6,872,379 B2 | 3/2005 | Zahringer et al. |
| 6,861,508 B2 | 4/2005 | Penev |
| 6,878,667 B2 | 4/2005 | Gaffney et al. |
| 6,887,436 B1 | 5/2005 | Fisher et al. |
| 6,887,456 B2 | 5/2005 | Xu et al. |
| 6,921,596 B2 | 7/2005 | Kelly et al. |
| 6,932,950 B1 | 8/2005 | Guetlhuber |
| 6,984,371 B2 | 1/2006 | Zhao et al. |
| 7,001,867 B2 | 2/2006 | Jin et al. |
| 7,037,349 B2 | 3/2006 | Dauer et al. |
| 7,048,897 B1 | 5/2006 | Koripella et al. |
| 7,070,633 B2 | 7/2006 | Okada et al. |
| 7,070,752 B2 | 7/2006 | Zeng et al. |
| 7,132,184 B2 | 7/2006 | Ogino et al. |
| 7,090,826 B2 | 8/2006 | Jiang et al. |
| 7,101,531 B2 | 9/2006 | Kamijo |
| 7,115,233 B2 | 10/2006 | Okada et al. |
| 7,118,717 B2 | 10/2006 | Shore |
| 7,147,836 B2 | 12/2006 | Ebert et al. |
| 7,147,946 B2 | 12/2006 | Kawasumi et al. |
| 7,156,866 B1 | 1/2007 | Nakamura et al. |
| 7,189,371 B2 | 3/2007 | Iwasaki |
| 7,192,458 B1 | 3/2007 | Harness et al. |
| 7,232,352 B2 | 6/2007 | Splaine |
| 7,247,258 B2 | 7/2007 | Jung et al. |
| 7,285,247 B2 | 10/2007 | Smaling et al. |
| 7,294,421 B2 | 11/2007 | Noetzel et al. |
| 7,323,148 B2 | 1/2008 | Shah et al. |
| 7,328,691 B2 | 2/2008 | Hataura et al. |
| 7,335,432 B2 | 2/2008 | Koripella |
| 7,344,572 B2 | 3/2008 | Yamamoto |
| 7,344,687 B2 | 3/2008 | Oi et al. |
| 7,364,812 B2 | 4/2008 | Taylor et al. |
| 7,368,482 B2 | 5/2008 | Basini et al. |
| 7,422,810 B2 | 9/2008 | Venkataramaran et al. |
| 7,490,580 B2 | 2/2009 | Hanai et al. |
| 7,578,861 B2 | 8/2009 | Kah et al. |
| 7,585,810 B2 | 9/2009 | Chen et al. |
| 7,625,414 B2 | 12/2009 | Nougier et al. |
| 7,632,320 B2 | 12/2009 | Tonkovich et al. |
| 7,691,509 B2 | 4/2010 | Han et al. |
| 7,704,618 B2 | 4/2010 | Venkataramaran et al. |
| 7,736,399 B2 | 6/2010 | Ravenda et al. |
| 7,846,599 B2 | 12/2010 | Ballantine et al. |
| 7,858,214 B2 | 12/2010 | Kelly et al. |
| 7,888,278 B2 | 2/2011 | Rapier et al. |
| 7,901,814 B2 | 3/2011 | Venkataramaran et al. |
| 7,976,787 B2 | 7/2011 | England et al. |
| 7,985,506 B2 | 7/2011 | Lee et al. |
| 7,985,509 B2 | 7/2011 | Kim et al. |
| 7,998,456 B2 | 10/2011 | Van Dijk et al. |
| 8,034,504 B2 | 10/2011 | Tsunoda et al. |
| 8,062,800 B2 | 11/2011 | Cho et al. |
| 8,142,941 B2 | 3/2012 | Bitoh |
| 8,158,289 B2 | 4/2012 | Cutright et al. |
| 8,173,310 B2 | 5/2012 | Son |
| 8,241,600 B1 | 8/2012 | Berry et al. |
| 8,257,669 B2 | 9/2012 | Jankowski |
| 8,277,524 B2 | 10/2012 | Keegan et al. |
| 8,298,711 B2 | 10/2012 | Yanase et al. |
| 8,304,122 B2 | 11/2012 | Pushusta et al. |

(56) References Cited

U.S. PATENT DOCUMENTS

| | | |
|---|---|---|
| 8,318,363 B2 | 11/2012 | Lim |
| 8,323,365 B2 | 12/2012 | Drnevich et al. |
| 8,337,757 B2 | 12/2012 | Roychoudhury et al. |
| 8,354,083 B2 | 1/2013 | Amsden et al. |
| 8,486,162 B2 | 7/2013 | Kim et al. |
| 8,557,451 B2 | 10/2013 | Edlund et al. |
| 2003/0054215 A1 | 3/2003 | Doshi et al. |
| 2003/0064259 A1 | 4/2003 | Gittleman |
| 2003/0188486 A1 | 10/2003 | Tanaka et al. |
| 2003/0211021 A1 | 11/2003 | Oi et al. |
| 2003/0211373 A1 | 11/2003 | Ueda et al. |
| 2003/0218991 A1 | 11/2003 | Besecker et al. |
| 2003/0234455 A1 | 12/2003 | Mieney et al. |
| 2003/0235726 A1 | 12/2003 | Kelly et al. |
| 2004/0009104 A1 | 1/2004 | Kaupert |
| 2004/0076562 A1 | 4/2004 | Manzanec et al. |
| 2004/0144030 A1 | 7/2004 | Smaling |
| 2004/0180247 A1 | 9/2004 | Higashiyama et al. |
| 2004/0191591 A1 | 9/2004 | Yamamoto |
| 2005/0008907 A1 | 1/2005 | Isozaki et al. |
| 2005/0028445 A1 | 2/2005 | Roychoudhury et al. |
| 2005/0069485 A1 | 3/2005 | Jung et al. |
| 2005/0051444 A1 | 4/2005 | Anumakonda et al. |
| 2005/0081444 A1 | 4/2005 | Anumakonda et al. |
| 2005/0154046 A1 | 7/2005 | Fujihara et al. |
| 2005/0188615 A1 | 9/2005 | Sennoun et al. |
| 2005/0191533 A1 | 9/2005 | Kim et al. |
| 2005/0267606 A1 | 12/2005 | Bartlett, Jr. et al. |
| 2006/0051634 A1 | 3/2006 | DeVries |
| 2006/0067861 A1 | 3/2006 | Tonkovich et al. |
| 2006/0133976 A1 | 6/2006 | Male et al. |
| 2006/0179717 A1 | 8/2006 | LaBarge |
| 2006/0246333 A1 | 11/2006 | Schaevitz et al. |
| 2007/0084118 A1 | 4/2007 | Kaeding et al. |
| 2007/0104641 A1 | 5/2007 | Ahmed et al. |
| 2007/0183949 A1 | 8/2007 | Fischer |
| 2007/0289215 A1 | 12/2007 | Hemmings et al. |
| 2008/0138273 A1 | 6/2008 | Jiang |
| 2008/0152970 A1 | 6/2008 | Rush et al. |
| 2008/0187797 A1 | 8/2008 | Edlund |
| 2009/0029205 A1 | 1/2009 | Venkatamaran et al. |
| 2009/0104482 A1 | 4/2009 | Miyazaki |
| 2009/0208784 A1 | 8/2009 | Perry et al. |
| 2009/0291335 A1 | 11/2009 | Anzai |
| 2010/0015479 A1 | 1/2010 | Rusch |
| 2010/0052292 A1 | 3/2010 | Lin et al. |
| 2010/0119894 A1 | 5/2010 | Ishida |
| 2010/0203404 A1 | 8/2010 | Miyazaki |
| 2010/0330446 A1 | 12/2010 | Lucka et al. |
| 2011/0039175 A1 | 2/2011 | Yokoyama et al. |
| 2011/0165483 A1 | 7/2011 | Yamamoto et al. |
| 2011/0189578 A1 | 8/2011 | Crumm et al. |
| 2011/0269032 A1 | 11/2011 | Fischer et al. |
| 2012/0062166 A1 | 3/2012 | Thornton et al. |
| 2012/0088167 A1 | 4/2012 | Reiners et al. |
| 2012/0164547 A1 | 6/2012 | Weingaertner et al. |
| 2012/0320969 A1 | 12/2012 | Zheng et al. |
| 2012/0328969 A1 | 12/2012 | DeWald et al. |
| 2013/0028815 A1 | 1/2013 | Basini et al. |
| 2013/0056911 A1 | 3/2013 | Finnerty et al. |
| 2013/0059223 A1 | 3/2013 | Finnerty et al. |
| 2013/0230787 A1 | 9/2013 | Finnerty et al. |
| 2014/0335483 A1 | 11/2014 | Friedrich et al. |

FOREIGN PATENT DOCUMENTS

| | | |
|---|---|---|
| GB | 1314984 A | 4/1973 |
| JP | 9502694 A | 3/1997 |
| JP | 2003272691 A | 9/2003 |
| JP | 2004035400 A | 2/2004 |
| JP | 2005186203 A | 7/2005 |
| JP | 2008007372 A | 1/2008 |
| JP | 2015504033 A | 2/2015 |
| WO | 9841394 A1 | 9/1998 |
| WO | 02099917 A2 | 12/2002 |
| WO | 2004/091771 A1 | 10/2004 |
| WO | 2006032644 A1 | 3/2006 |
| WO | 2006034868 A1 | 4/2006 |
| WO | 2008031024 A1 | 3/2008 |
| WO | 2009116977 A2 | 9/2009 |
| WO | 2011019825 A2 | 2/2011 |

OTHER PUBLICATIONS

K. Kendall, C. Finnerty, G.A. Tompsett, P. Windibank, and N. Coe, "Rapid Heating SOFC System for Hybrid Applications." Electrochemistry, vol. 68, No, 6, (2000) 403.

Finnerty C., Cunningham R.H., Ormerod R.M, "Development of a novel test system for in situ catalytic, electrocatalytic and electrochemical studies of internal fuel reforming in solid oxide fuel cells." Catalysis letters, vol. 66, No. 4, (2000) 221-226(6).

C. Finnerty, N.J. Coe, R.H. Cunningham and R.M. Ormerod, "Steam Reforming and Partial Oxidation of Methane over nickel/zirconia and doped nickel/zirconia anodes in working solid oxide fuel cells." Catalysis Today, In press (1998).

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty, R.H. Cunningham and R.M. Ormerod, "Study of the Catalysis and Surface Chemistry occurring at nickel/zirconia anodes in solid oxide fuel cells running on natural gas." Radiation Effects and Defects in Solids [ISSN 1042-0150]. vol. 151 pp. 77-92.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

R.H. Cunningham, C. Finnerty and R.M. Ormerod, "Study of Surface Carbon formed on working anodes of Solid Oxide Fuel Cells running on methane" Proc. 5th Int. Symp. on SOFCs, The Electrochem. Soc., 1997, 973-983.

Finnerty C, Cunningham RH, Ormerod RM, "Development of a novel solid oxide fuel cell system based on a tubular zirconia reactor." Radiaton Effects and Defects in Solids [ISSN 1042-0150]. vol. 151 pp. 71-76.

Finnerty, Caine, and David Coimbra, "Solid oxide fuel cells with novel internal geometry." U.S. Pat. No. 6,998,187. Feb. 14, 2006.

Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchi, European Fuel Cell Forum.

Finnerty C, Cunningham RH, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999. International Society for Solid-state Ionics.

Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Dokiya, Published by The Electrochemical Society, ISBN 1-56677-242-7.

Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by The Electrochemical Society, ISBN 1-56677-242-7.

Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.

(56) References Cited

OTHER PUBLICATIONS

Caine Finnerty, Neil J. Coe, Robert H. Cunningham and R. Mark Ormerod. "Carbon formation on and deactivation of nickel-based/zirconia anodes in solid oxide fuel cells running on methane." Catalysis Today, vol. 46, Issues 2-3, Nov. 16, 1998, pp. 137-145.

K. Kendall, C. Finnerty, G. Saunders and J. T. Chung, "Effects of dilution on methane entering an SOFC anode" Journal of Power Sources, vol. 106, Issues 1-2, Apr. 1, 2002, pp. 323-327.

G.A. Tompsett, C. Finnerty, K. Kendall, T. Alston and N. M. Sammes, "Novel applications for micro-SOFCs." Journal of Power Sources, vol. 86, Issues 1-2, Mar. 2000, pp. 376-382.

Caine Finnerty and R. Mark Ormerod, "Internal reforming over nickel/zirconia anodes in SOFCS oparating on methane: influence of anode formulation, pre-treatment and operating conditions." Journal of Power Sources, vol. 86, Issues 1-2, Mar. 2000, pp. 390-394.

C. Finnerty, T. Alston, K. Kendall and R.M. Ormerod, "Development of a small portable SOFC system with integrated catalytic fuel processing." Sixth Grove Fuel Cell Symposium, Sep. 1999, 125.

C. Finnerty, K. Kendall, J. C. Austin, T. Alston ,"Ceramic fuel cells to replace metal burners." Journal of Material science, 36, (2001) 1119-1124.

Ormerod RM, Finnerty CM, Cunningham RH, "In situ catalytic and electrocatatytic studies of internal fuel reforming in solid oxide fuel cells running on natural gas." Studies in Surface Science and Catalysis, Elsevier, [ISBN 0-444-50480-X]. 7 pp. 425-431.

P.K. Cheekatamarla, C.M. Finnerty et al., "Highly Efficient Next-Generation Tubular Solid Oxide Fuel Cells Powered by Readily Available Hydrocarbon Fuels", To be submitted to Nature, 2008.

P.K. Cheekatamarla, C. M. Finnerty, "Synthesis gas generation via partial oxidation reforming of liquid fuels." Accepted for publication, International Journal of Hydrogen Energy, 2008.

Y. Du, C. Finnerty, and J. Jiang, "Thermal Stability of Portable Microtubular SOFCs and Stacks." In press, Journal of the Electrochemical Society, 155(9), 1-XXXX, (2008).

Y. Du, C. Finnerty, and J. Jiang, "Thermal Stability of Portable Micro-Tubular Solid Oxide Fuel Cell and Stack" ECS Trans. 12, (1) 363 (2008).

P.K. Cheekatamarla, C.M. Finnerty , Jun Cai, "Internal reforming of hydrocarbon fuels in tubular solid oxide fuel cells." International Journal of Hydrogen Energy, vol. 33, Issue 7, Apr. 2008, pp. 1853-1858.

Praveen K. Cheekatamarla, C.M. Finnerty, "Reforming catalysts for hydrogen generation in fuel cell applications." Journal of Power Sources, vol. 160, Issue 1, Sep. 29, 2006, pp. 490-499.

P.K. Cheekatamarla, C.M. Finnerty, "Hydrogen Generation via partial oxidation reforming of liquid fuels." Prepr. Pap.-Am. hem. Soc., Div. Fuel Chem. 2007, 52 (2), 288.

P.K. Cheekatamarla, C.M. Finnerty , Jun Cai, "Internal reforming of hydrocarbon fuels in tubular solid oxide fuel cells." ECS Trans. 12, (1) 439 (2008).

P. K Cheekatamarla, C. M. Finnerty, A. Stanley, C. Robinson, P. Dewald, Y. Lu, Y. Du, "Performance Characteristics of an Integrated Portable JP8 SOFC—Reformer System." ECS Transactions vol. 5, Mar. 2007.

C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.

C. Finnerty, C. Robinson, S. Andrews, Y. Du, P. Cheekatamarla, P. Dewald, Y. Lu, T. Schwartz, "Portable Propane Micro-Tubular SOFC System Development" ECS Transactions—Solid Oxide Fuel Cells, vol. 7, Jun. 2007.

D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.

D. Bhattacharya, R. Rengaswamy and C. Finnerty, "Dynamic Simulation and Analysis of a Solid Oxide Fuel Cell", in the proceedings of ESCAPE-17, Bucharest, 2007.

Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.

Debangsu Bhattacharya, Raghunathan Rengaswamy and Caine Finnerty, "A Twodimensional Dynamic Model for Tubular Solid Oxide Fuel Cell", presented at the Annual AIChE meeting, San Francisco, 2006.

Debangsu Bhattacharya, Raghunathan Rengaswamy and Caine Finnerty, "Optimization Studies on Anode-Supported Tubular Solid Oxide Fuel Cells", presented at the Annual AIChE Meeting, Salt Lake City, 2007.

Debangsu Bhattacharya, Raghunathan Rengaswamy and Caine Finnerty, "Dynamics and Volterra-Model Based Control of a Tubular Solid Oxide Fuel Cell", presented at the Annual AIChE Meeting, Salt Lake City, 2007.

Debangsu Bhattacharya, Raghunathan Rengaswamy and Caine Finnerty, "Identification and Control of a Tubular Solid Oxide Fuel Cell ( SOFC)", presented at the Annual AIChE meeting, Philadelphia, 2008.

Praveen K. Cheekatamarla, Caine M. Finnerty, Yanhai Du, Juan Jiang, Jian Dong, P.G. Dewald, C. R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.

Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/kerosene fueled portable SOFC power generator", Original Research Article Journal of Power Sources, vol. 193, Issue 2, Sep. 5, 2009, pp. 797-803.

Debangsu Bhattacharyya, Raghunathan Rengaswamy, Caine Finnerty, "Dynamic modeling and validation studies of a tubular solid oxide fuel cell." Original Research Article Chemical Engineering Science, vol. 64, Issue 9. May 1, 2009, pp. 2158-2172.

Zuo, Chendong et al. "Advanced Anode-supported Micro-tubular SOFC Development." ECS Transactions 17.1 (2009): 103-110.

Finnerty, Caine, and David Coimbra, "Anode-supported solid oxide fuel cells using a cermet electrolyte." U.S. Pat. No. 7,496,095. Mar. 3, 2009.

Finnerty, Caine M. "The catalysis and electrical performance of nickel-based/zirconia fuel reforming anodes in solid oxide fuel cells running on methane." Diss. University of Keele, 1998.

Khaligh, Alireza, et al, "Digital control of an isolated active hybrid fuel cell/Li-Ion battery power supply." IEEE Transactions on Vehicular technology 56.6 (2007): 3709-3721.

Lankin, Michael, Yanhai Du, and Caine Finnerty, "A review of the implications of silica in solid oxide fuel cells." Journal of Fuel Cell Science and Technology 8.5 (2011): 054001.

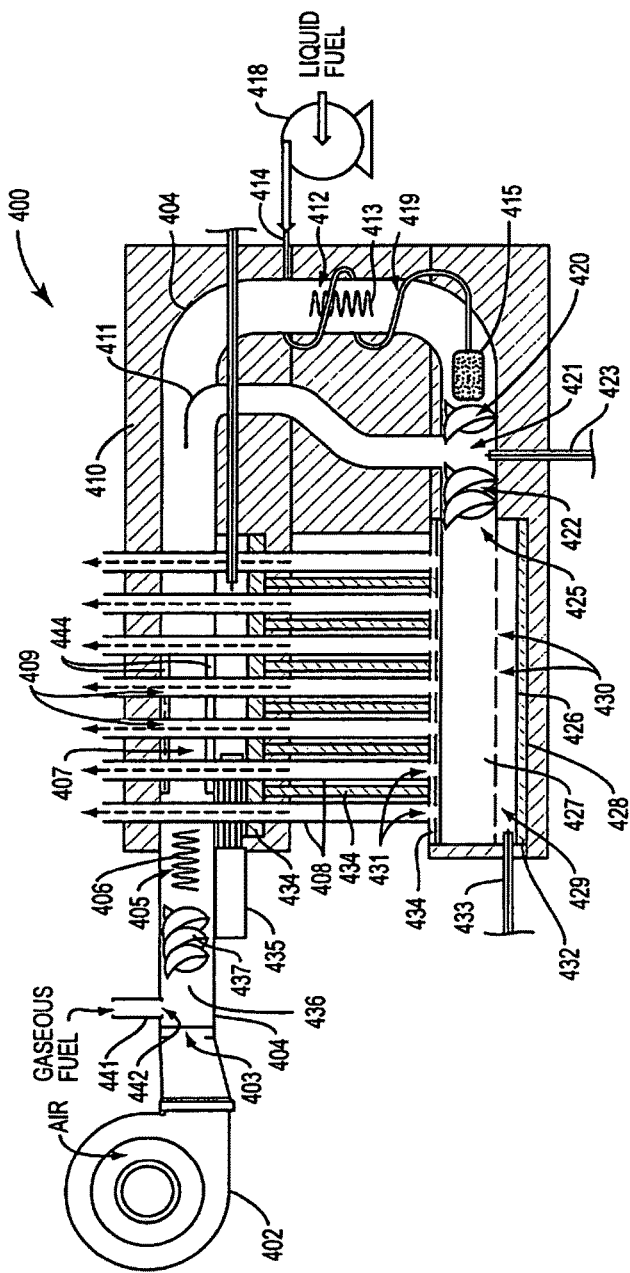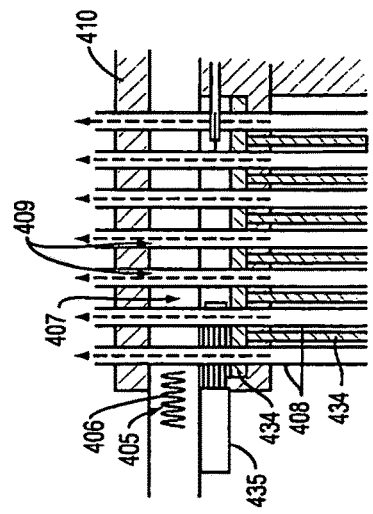
FIG. 4A
FIG. 4B

DUEL UTILIZATION LIQUID AND GASEOUS FUEL REFORMER AND METHOD OF REFORMING

CROSS REFERENCE TO RELATED APPLICATIONS

This application is a national stage of International Application No. PCT/US2014/064362, which was filed on Nov. 6, 2014, and which claims priority to U.S. Provisional Application No. 61/900,543 filed on Nov. 6, 2013, and U.S. Provisional Application No. 61/900,510 filed on Nov. 6, 2013, the entire contents of each of which are incorporated herein by reference.

BACKGROUND

The present teachings relate to reformers and methods of reforming of liquid and gaseous reformable fuels to produce hydrogen-rich reformates.

The conversion of a gaseous or liquid reformable fuel to a hydrogen-rich carbon monoxide-containing gas mixture, a product commonly referred to as "synthesis gas" or "syngas," can be carried out in accordance with any of such well known fuel reforming operations as steam reforming, dry reforming, autothermal reforming, and catalytic partial oxidation (CPOX) reforming. Each of these fuel reforming operations has its distinctive chemistry and requirements and each is marked by its advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such hydrogen, mixtures of hydrogen and carbon monoxide, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) are widely believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as converters of such fuels to electricity, and the integration of fuel reformers and fuel cells into more compact, reliable and efficient devices for the production of electrical energy.

In general, reformers are designed and constructed to process either gaseous or liquid reformable fuel but not both. A reformer that was capable of selectively processing one of these types of fuel and at some point, switching over to the processing of the other type of fuel would have considerable advantages over reformers that are capable of processing only one of these types of fuel. For example, a dual utilization liquid and gas reformer would be able to switch from processing one type of fuel to the other in response to a change in circumstances such as the altered economics of operating the reformer with one or the other fuel or the relative availability of the fuels at a particular time and/or in a particular place.

Accordingly, there exists a need for a reformer capable of utilizing both liquid and gaseous reformable fuels and a method for the selective reforming of such fuels within the same reformer.

SUMMARY

In accordance with the present disclosure, a dual utilization liquid and gaseous fuel CPOX reformer is provided which comprises:
  a liquid fuel gas phase reforming reaction zone;
  a gaseous fuel gas phase reforming reaction zone;
  a gas flow conduit comprising an oxygen-containing gas inlet, a liquid fuel inlet, a gaseous fuel inlet or oxygen-containing gas and gaseous fuel reforming reaction mixture inlet, a first heating zone thermally coupled to a first heater, a second heating zone thermally coupled to an internal and/or external source of heat, a liquid fuel vaporizer, and a gaseous reforming reaction mixture outlet in gas-flow communication with the liquid fuel and gaseous fuel reforming reaction zones;
  a gaseous reforming reaction mixture igniter in thermal communication with each of the liquid and gaseous fuel reforming reaction zones; and,
  a hydrogen-rich reformate outlet.

Further in accordance with the present disclosure, a method is provided for reforming within a dual utilization liquid and gaseous fuel reformer comprising a first, or liquid fuel, gas phase reforming reaction zone, a second, or gaseous fuel, gas phase reforming reaction zone, or a common, or liquid and gaseous fuel reforming reaction zone, the method comprising:
  (a) reforming first gaseous reforming reaction mixture comprising oxygen-containing gas and vaporized liquid fuel within the first or common reforming reaction zone to produce hydrogen-rich reformate;
  (b) before or after reforming step (a), reforming second gaseous reforming reaction mixture comprising oxygen-containing gas and gaseous fuel within the second or common reforming reaction zone to produce hydrogen-rich reformate; and,
  (c) transitioning from reforming step (a) to reforming step (b) such that heat recovered from reforming step (a), with or without additional heat, is utilized to initiate reforming step (b), or transitioning from reforming step (b) to reforming step (a) such that heat recovered from reforming step (b), with or without additional heat, is utilized to vaporize liquid fuel and heat the second or common reforming reaction zone before the start of reforming step (a).

The dual utilization liquid and gaseous fuel reformer and reforming methods of this disclosure, given their capability for the selective reforming of liquid and gaseous fuels, are able to effectively and efficiently respond to circumstances that would tent to temporarily favor the reforming of one of these types of fuel over the other. This capability for flexible and selective reforming of liquid and gaseous fuels, whichever fuel may have the advantage in view of current circumstances, can be especially advantageous where the reformer may be expected to operate in different locations as, for example, the case with a mobile or portable reformer in contrast to a fixed-site reformer.

Another major operational advantage of the reformers and reforming methods herein can be their capability for achieving a cold start, i.e., a start with little or no heat available from a previous reforming operation, with gaseous fuel which requires no preheating procedure and after only a relatively brief period of reforming of gaseous fuel during which hot reformate heats up the vaporizer and CPOX reaction zone, discontinuing reforming of the gaseous fuel and quickly transitioning to a steady-state mode of reforming of liquid fuel. In effect, heat of exotherm recovered from the initial reforming of gaseous fuel can be efficiently utilized by the reformer upon switching over to reforming of liquid fuel to vaporize the fuel and preheat the reaction zone. Operated in this manner, the reformer herein allows the subsequent reforming of liquid fuel to dispense with a cold-start mode of operation and immediately enter into a steady-state mode of operation.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

FIG. 4A is a longitudinal cross section view of an embodiment of dual utilization gaseous and liquid fuel reformer in accordance with the present teachings. FIG. 4B illustrates a modification of the reformer of FIG. 4A in accordance with the present teachings whereby the modified reactor comprises a single reactor having a common reaction zone for the reforming of both liquid and gaseous fuels.

DETAILED DESCRIPTION

Figure 1A:
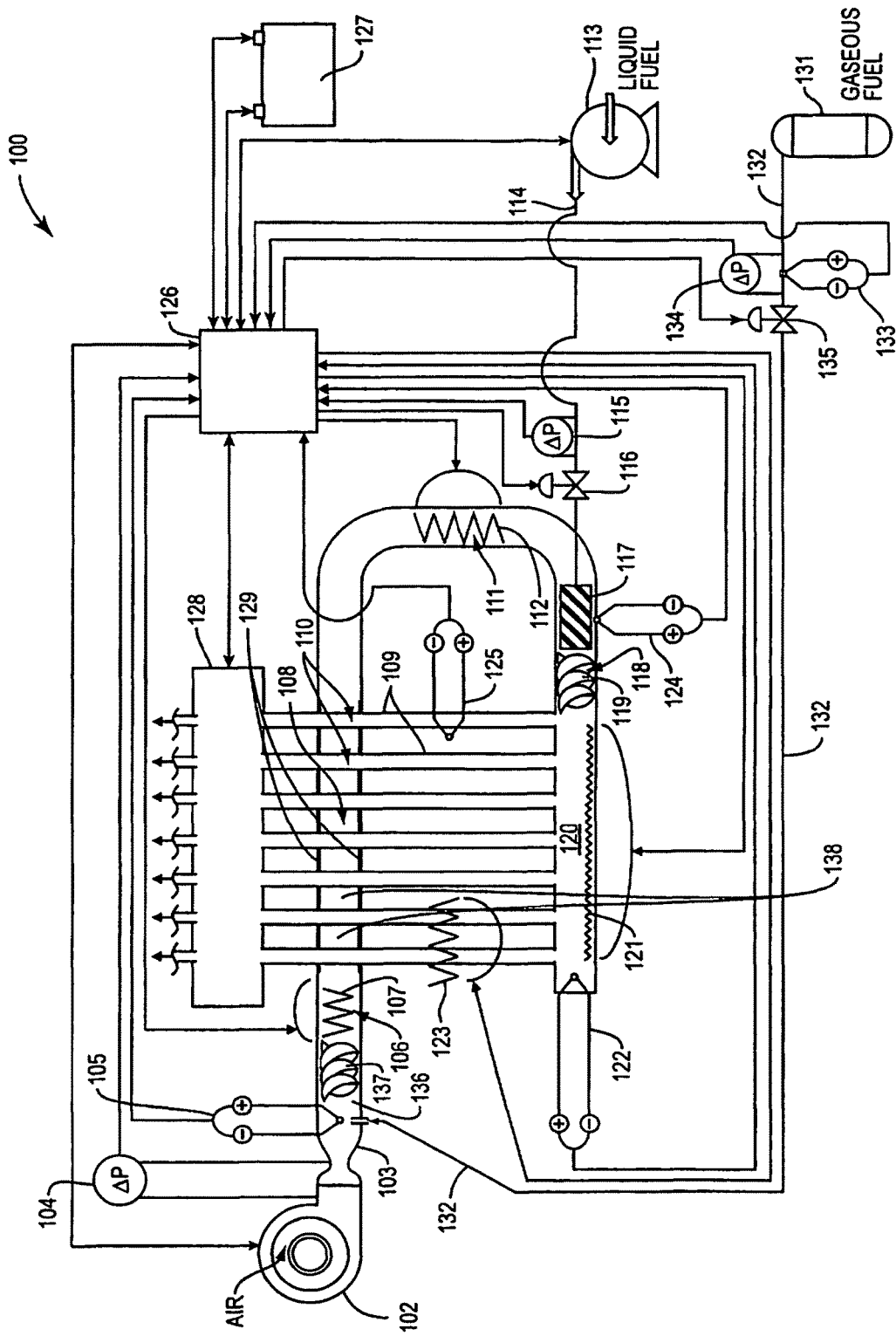
FIGS. 1A and 1B are schematic block diagrams of two embodiment of dual utilization liquid and gaseous fuel reformer, specifically, a CPOX reformer, in accordance with the present teachings and an exemplary control system for managing their operation.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

For brevity, the discussion and description herein will mainly focus on partial oxidation reforming reactions and reactants including catalytic partial oxidation reforming reactions and reactants (a reformable fuel and an oxygen-containing gas). However, the devices, assemblies, systems and methods described herein can apply to other reforming reactions such as steam reforming and autothermal reforming and their respective reactants (a reformable fuel and steam, and a reformable fuel, steam and an oxygen-containing gas, respectively). Accordingly, where an oxygen-containing gas is referenced herein in connection with a device or method, the present teachings should be considered as including steam in combination or alone, i.e., an oxygen-containing gas and/or steam, unless explicitly stated otherwise or understood by the context. In addition, where a reformable fuel is referenced herein in connection with a device or method, the present teachings should be considered as including steam in combination or alone, i.e., a reformable fuel and/or steam, unless explicitly stated otherwise or as understood by the context.

In addition, the reformers and methods of the present teachings should be understood to be suitable to carry out steam reforming and auto thermal reforming, for example, within the same structure and components and/or with the same general methods as described herein. That is, the reformers and methods of the present teachings can deliver the appropriate liquid reactants, for example, liquid reformable fuel and/or liquid water, from a liquid reformable fuel reservoir to a vaporizer to create a vaporized liquid reformable fuel and steam, respectively, and the appropriate gaseous reactants, for example, at least one of an oxygen-containing gas, a gaseous reformable fuel and steam, from their respective sources to a desired component of a fuel cell unit or system. In other words, various liquid reactants can be delivered through the liquid delivery part of the system and various gaseous reactants can be delivered through the gas delivery part of the system.

Where water is used in the delivery system, recycled heat from one or more of a reformer, a fuel cell stack and an afterburner of a fuel cell unit or system can be used to vaporize the water to create steam, which can be present in the delivery system and/or introduced into the delivery system from an independent source.

Throughout the application, where compositions are described as having, including or comprising specific components, or where methods are described as having, including, or comprising specific method steps, it is contemplated that such compositions also consist essentially of, or consist of, the recited components and that such methods also consist essentially of, or consist of the recited method steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the focus and scope of the present teachings whether explicit or implicit therein. For example, where reference is made to a particular structure, that structure can be used in various embodiments of the apparatus and/or method of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, two or more steps or actions can be conducted simultaneously.

At various places in the present specification, values are disclosed in groups or in ranges. It is specifically intended that a range of numerical values disclosed herein include each and every value within the range and any subrange thereof. For example, a numerical value within the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40, and any subrange thereof, for example, from 0 to 20, from 10 to 30, from 20 to 40, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel CPOX reformers of the present teachings illustrated in certain of the accompanying figures.

As used herein, a "reformable fuel" refers to a liquid reformable fuel and/or a gaseous reformable fuel.

The term "ceramic," in addition to its art-recognized meaning, shall be understood herein to include glasses, glass-ceramics and cermets (i.e., ceramic-metal composites).

The expression "gas permeable" as it applies to a wall of a CPOX reactor unit herein shall be understood to mean a wall structure that is permeable to gaseous CPOX reaction mixtures and gaseous product reformate including, without limitation, the vaporized liquid reformable fuel component of the gaseous CPOX reaction mixture and the hydrogen component of the product reformate.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reforming reaction mixture" refers to a mixture including a gaseous liquid reformable fuel (e.g., a vaporized liquid reformable fuel), a gaseous reformable fuel or combinations thereof, and an oxygen-containing gas (e.g., air) and/or water (e.g., in the form of steam). A gaseous reforming reaction mixture can be subjected to a reforming reaction to create a hydrogen-rich product ("reformate"), which also can contain carbon monoxide. Where a catalytic partial oxidation reforming reaction is to be carried out, the gaseous reforming reaction mixture can be referred to a "gaseous CPOX reforming reaction mixture," which includes a reformable fuel and an oxygen-containing gas. Where a steam reforming reaction is to be carried out, the gaseous reforming reaction mixture can be referred to as a "gaseous steam reforming reaction mixture," which includes a reformable fuel and steam. Where an autothermal reforming reaction is to be carried out, the gaseous reforming reaction mixture can be referred to as a "gaseous AT reforming reaction mixture," which includes a reformable fuel, an oxygen-containing gas and steam.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, ammonia, and the like, that when subjected to reforming undergo conversion to hydrogen-rich reformates.

The term "reforming reaction" shall be understood to include the exothermic and/or endothermic reaction(s) that occur during the conversion of a gaseous reaction medium to a hydrogen-rich reformate. The expression "reforming reaction" herein therefore includes, for example, CPOX, autothermal and steam reforming.

The expression "CPOX reaction" shall be understood to include the reaction(s) that occur during catalytic partial oxidation reforming or conversion of a reformable fuel to a hydrogen-rich reformate.

The expression "gaseous CPOX reaction mixture" refers to a mixture of gaseous reformable fuel or vaporized liquid reformable fuel and an oxygen-containing gas, for example, air.

The expression "open gaseous flow passageway" refers to a conduit or channel for the passage of gas therethrough where a solid, including a porous solid or material, is not present across the entire cross-sectional plane of the conduit or channel, i.e., a conduit of channel free of solids, including porous solids. For example, in the case of a CPOX reactor unit, CPOX catalyst including a porous catalyst such as a monolith, cannot be present, across the entire internal cross-sectional plane perpendicular to the longitudinal axis of a tubular CPOX reactor unit. Such a structure is distinct from passageways that are packed with a porous catalyst. An open gaseous flow passageway can also be present in a CPOX reactor unit which can be defined as a tube which defines a hollow bore, or a cylindrical substrate defining a hollow bore therethrough along its longitudinal axis. In these exemplary descriptions, the hollow bore can be considered an open gaseous flow passageway. Although an open gaseous flow passageway usually can extend along a longitudinal axis of a CPOX reactor unit, a tortuous conduit or channel is also contemplated by the present teachings and can be capable of having an open gaseous flow passageway provided that the tortuous conduit or channel is free of solids across a cross-sectional plane of the CPOX reactor unit. It should also be understood that the cross-sectional dimension(s) of an open gaseous flow passageway can vary along its longitudinal axis or along the tortuous conduit or channel.

The expression "cold start-up mode of reforming" shall be understood herein to refer to a start-up mode of operation of the reformer wherein there is little or no heat recoverable from a previous reforming operation. A reformer at essentially ambient temperature requires a cold start-up mode of operation before it can enter into a steady-state mode of reforming.

The expression "hot start-up mode of operation of reforming" shall be understood herein to refer to a start-up mode of operation of the reformer wherein residual heat recovered from a previous exothermic reforming operation is effectively utilized to facilitate transitioning from the processing of liquid fuel to the processing of gaseous fuel and, conversely, transitioning from the processing of gaseous fuel to the processing of liquid fuel.

Again, as stated previously for brevity, the discussion and description herein will focus on partial oxidation reforming reactions and reactants including catalytic partial oxidation reforming reactions and reactants (a reformable fuel and an oxygen-containing gas). However, the devices, assemblies, systems and methods described herein can equally apply to other reforming reactions such as steam reforming and autothermal reforming and their respective reactants. For example, for steam reforming steam can replace an oxygen-containing gas in the description herein. For autothermal reforming, steam can be introduced along with an oxygen-containing gas and/or a reformable fuel in the description herein.

The dual utilization liquid and gaseous fuel reformer and method of reforming herein are capable of processing either a liquid or gaseous fuel and after a shut-down period during which heat of exotherm produced by reforming has largely dissipated, for example, to such an extent that the reactor has reached ambient or near-ambient air temperature, and thereafter switching over to operating on the other type of fuel.

The reformer and method of reforming herein are also capable of initially processing liquid fuel and thereafter transitioning to processing gaseous fuel, in this way utilizing heat of exotherm recovered from the conversion of liquid fuel to reformate, possibly augmented by additional heat supplied, for example, by an electrical resistance heater unit, to initiate the conversion of gaseous fuel.

The reactor and method of reforming herein are also capable of initially processing gaseous fuel and thereafter transitioning to processing liquid fuel, this time utilizing heat of exotherm recovered from the conversion of gaseous fuel, with or without additional heat, to vaporize the liquid fuel and heat the reforming reaction zone prior to conducting the conversion of the liquid fuel to reformate.

In particular embodiments, a vaporizer for vaporizing liquid reformable fuel is in fluid flow communication with the inlet of the reforming reaction zone wherein conversation of the liquid fuel to reformate is made to take place. The vaporizer can be operated to eliminate or reduce the risk of heating the fuel to a temperature at or above its flash point and/or causing appreciable pyrolysis of fuel.

In various embodiments, an igniter for initiating the reaction within a reforming reaction zone, for example, during a start-up mode of operation of the reformer, is in thermal communication with a reforming reaction zone.

The dual utilization liquid and gaseous fuel reformer herein can comprise a single reaction zone, or in other embodiments, a plurality, or array, of spaced-apart tubular reforming reactor units, each reactor unit having its own reforming reaction zone. A hydrogen barrier can be attached to the external surface of at least the wall section of such tubular reforming reactor unit corresponding to its reforming reaction zone in order to prevent or inhibit the loss of hydrogen therefrom.

The dual utilization liquid and gaseous fuel reformer of the present teachings can include a conduit for managing the flow of gas(es) to its reforming reaction zone(s). The conduit can include an inlet for the admission of oxygen-containing gas, an inlet for the admission of liquid fuel, vaporized liquid fuel or both, an inlet for the admission of gaseous fuel or mixture of oxygen-containing gas and gaseous fuel, and an outlet for gaseous reforming reaction mixture. The conduit is advantageously U-shaped for a more compact reformer configuration.

In certain embodiments, the reformer herein can have a split routing system for directing the flow of the oxygen-containing gas component of the gaseous reforming reaction mixture where one portion of the oxygen-containing gas can be combined with vaporized liquid in order to provide a relatively fuel-rich gaseous reaction mixture which is resistant to flashing and another portion of the oxygen-containing gas can be combined with the fuel-rich reaction mixture such as to provide a gaseous reforming reaction mixture that comes within a preset molar ratio of oxygen to carbon for a desired CPOX reforming reaction.

In some embodiments, a manifold, or plenum, in fluid communication with the inlets of reforming reactor units comprising the aforedescribed plurality, or array, of such units can be configured to provide a more uniform distribution of gaseous reforming reaction mixture thereto, for example, at a substantially uniform composition, at a substantially uniform temperature and/or at a substantially uniform rate. In certain embodiments, the manifold can have a housing or enclosure that defines a manifold chamber. The manifold or manifold chamber can include a gas distributor, for example, a gas distributor disposed within the manifold chamber, for more evenly distributing gaseous reforming reaction mixture to the inlets of the reforming reactor units. The manifold housing, or manifold enclosure, can be fabricated from a relatively low cost, readily moldable thermoplastic or thermosetting resin and/or can feature "cold seal" connections between its outlets and the inlets of the CPOX reactor units.

The reformer of the present teachings includes a first heating zone and first heater thermally linked thereto operable during a start-up mode of operation of the reformer to heat oxygen-containing gas introduced into the conduit within an initial range of elevated temperature. The reformer also includes a second heating zone and internal or external source of heat thermally linked thereto operable during a steady-state mode of operation of the reformer to heat oxygen-containing gas to within an initial range of elevated temperature.

The reformer of the present teachings can also include a third heating zone and second heater thermally linked thereto operable during start-up and steady-state modes of operation of the reformer to heat oxygen-containing gas to within a further elevated range of elevated temperature.

The reformer of the present teachings can include a mixer, for example, a static mixer, disposed within a mixing zone, in order to more uniformly mix oxygen-containing gas and vaporized liquid reformable fuel.

The reformer of the present teachings can include a reformate processing unit or device, for example, a carbon monoxide removal device to reduce the carbon monoxide content of the product reformate. A reformate processing unit or device can include a water gas shift converter, a preferential oxidation reactor, and/or a hydrogen-selective membrane for separating reformate into a hydrogen stream and a carbon monoxide-containing stream.

In various embodiments, the reformer of the present teachings can include one or more outlets for hydrogen-rich reformate directly connected to inlet(s) of another device, for example, a fuel cell.

A reformer of the present teachings can include thermal insulation for reducing heat loss from the reforming reaction zone(s) and/or other heat-radiating components of the reformer.

The reformer of the present teachings can include a gaseous stream driver for driving gaseous flow to, within and/or through the reformer. For example, the gaseous stream driver can be a single centrifugal blower unit or a blower system comprising a series of interconnected blower units. A blower or blower unit in a series can include a casing having an axial inlet and a radial outlet, an impeller disposed within the casing for drawing in a gas, for example, an oxygen-containing gas such as air, in the axial inlet and expelling the gas through the radial outlet; and a motor for driving the impeller. In certain embodiments, the blower can draw in a gas at a first pressure and expel the gas at a second, for example, higher, pressure. A blower can also include a duct connecting the radial outlet of at least one blower unit in the series with the axial inlet of at least one other blower unit in the series.

A reformer of the present teachings can include a liquid fuel pump. Examples of suitable liquid fuel pumps include metering pumps, rotary pumps, impeller pumps, diaphragm pumps, peristaltic pumps, positive displacement pumps, gear pumps, piezoelectric pumps, electrokinetic pumps, electroosmotic pumps, capillary pumps and the like.

A reformer of the present teachings can include one or more sensor assemblies for monitoring and controlling reformer operation. Examples of sensor assemblies include flow meters, thermocouples, thermistors and resistance temperature detectors.

A reformer of the present teachings also can include a controller for automating the operation of the reformer in its start-up, steady-state and/or shut-down modes. The controller can include a plurality of sensor assemblies such as those aforementioned in communication therewith.

The dual utilization liquid and gaseous fuel reformer and method of reforming according to the present teachings are described generally above and elsewhere herein. The following description with reference to the figures of drawing embellishes upon certain of these features and others of the reformer and reforming method of the present teachings and should be understood to discuss various and specific embodiments without limiting the essence of the invention and that can be applicable to the discussion above.

Figure 1B:
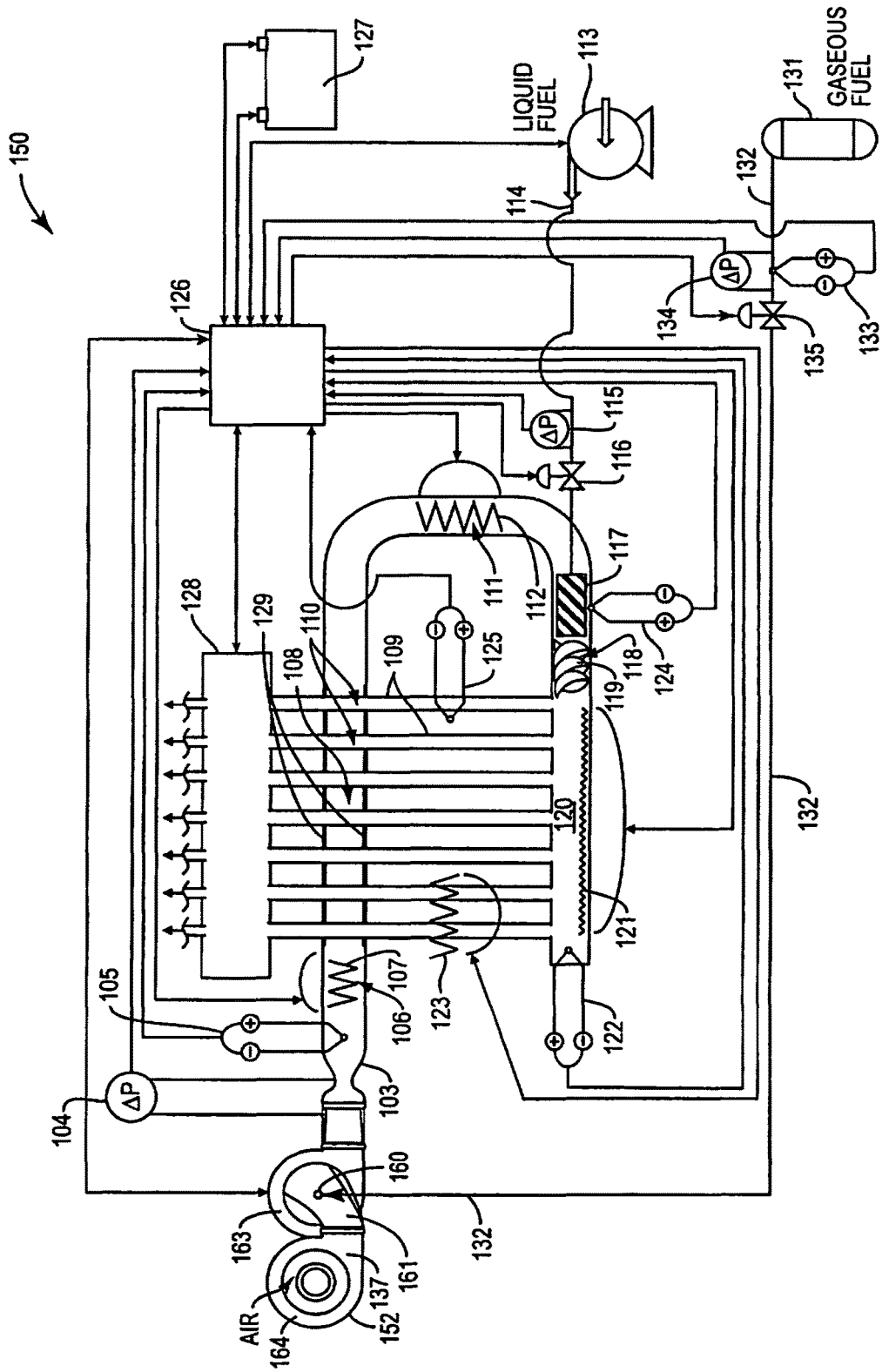

Referring now to the drawings, FIGS. 1A and 1B illustrate embodiments of the dual utilization liquid and gaseous fuel CPOX reformer in accordance with the present teachings.

As shown in FIG. 1A, dual utilization liquid and gaseous fuel CPOX reformer 100 includes centrifugal blower 102 for introducing oxygen-containing gas, exemplified here and in the other embodiments of the present teachings by air, into conduit 103, and for driving this and other gaseous streams (inclusive of vaporized fuel-air mixture(s) and hydrogen-rich reformates) through the various passageways, including the open gaseous flow passageways of tubular CPOX reactor units 109 of the reformer. Conduit 103 can include flow meter 104 and thermocouple 105. These and similar devices can be placed at various locations within CPOX reformer 100 in order to measure, monitor and control the operation of the reformer as more fully explained below in connection with controller 126.

In an ambient temperature, or "cold", start-up mode of operation of CPOX reformer 100 in which a first gaseous CPOX reaction mixture (i.e., oxygen-containing gas and vaporized liquid fuel) is made to undergo conversion to hydrogen-rich reformate, air at ambient temperature, introduced by blower 102 into conduit 103, passes through first heating zone 106, where the air is initially heated by first heater 107, for example, of the electrical resistance type, to within a preset, or targeted, first range of elevated temperature at a given rate of flow. The initially heated air then passes through heat transfer zone 108 which in the steady-state mode of operation of CPOX reformer 100 is heated by heat of exotherm recovered from the CPOX reaction occurring within CPOX reaction zones 110 of tubular CPOX reactor units 109. Once such steady-state operation of reformer 100 is achieved, i.e., upon the CPOX reaction within CPOX reaction zones 110 becoming self-sustaining, the thermal output of first heater 107 can be reduced or its operation discontinued since the incoming air will have already been heated by passage through heat transfer zone 108 to within, or approaching, its first range of elevated temperature.

Continuing further downstream within conduit 103, the air which has initially been heated, either by passage through first heating zone 106 during a start-up mode of operation or by passage through heat transfer zone 108 during a steady-state mode of operation, passes through second heating zone 111 where it is further heated by second heater 112, which can also be of the electrical resistance type, to within a second range of elevated temperature. Second heater 112 operates to top-off the temperature of the previously heated air thereby satisfying several operational requirements of CPOX reformer 100 when processing liquid fuel, namely, assisting in the regulation and fine-tuning of the thermal requirements of the reformer on a rapid response and as-needed basis, providing sufficient heat for the subsequent vaporization of liquid reformable fuel introduced further downstream into conduit 103 and providing heated gaseous CPOX reaction mixture.

Liquid reformable fuel, exemplified here and in other embodiments of the present teachings by diesel, is continuously introduced from storage via pump 113 through fuel fine 114, equipped with optional flow meter 115 and optional flow control valve 116, and into conduit 103 where the fuel is vaporized by vaporizer system 117 utilizing heat provided by heated air flowing from second heating zone 111. The vaporized, i.e., gaseous, fuel combines with the stream of heated air in mixing zone 118 of conduit 103. A mixer, for example, a static mixer such as in-line mixer 119, and/or vortex-creating helical grooves formed within the internal surface of conduit 103, or an externally powered mixer (not shown), are disposed within mixing zone 118 of conduit 103 in order to provide a more uniform vaporized liquid fuel-air gaseous CPOX reaction mixture than would otherwise be the case.

The heated vaporized liquid fuel-air CPOX reaction mixture enters manifold, or plenum, 120 which functions to distribute the reaction mixture more evenly and, for example, at a more uniform temperature, into tubular CPOX reactor units 109. While the conduit and the manifold will ordinarily be surrounded by thermal insulation (e.g., insulation 410 of CPOX reformer 400 illustrated in FIG. 4A), the CPOX reaction mixture can still undergo a drop in temperature due to heat loss through the walls of the manifold, which typically has a greater volume, and hence a greater wall surface area, than that of a comparable length of conduit 103. Another factor that can cause a drop in the temperature of the CPOX reaction mixture within manifold 120 is the reduction in pressure and velocity which the reaction mixture undergoes as it exits conduit 103 and enters the larger space of manifold 120.

Reductions in the temperature of a CPOX reaction mixture due to either of these factors, particularly those occurring in regions of the reaction mixture that are proximate to, or in contact with interior walls, corners and/or other recesses of manifold 120, can induce localized condensation of vaporized fuel. To minimize the possibility of such condensation, a manifold can be provided with means for maintaining the temperature of the gaseous CPOX reaction mixture above the condensation threshold of its vaporized fuel component. For example, as shown in FIG. 1A, heater 121 of the electrical resistance type, and thermocouple or thermistor probe 122 for purposes of temperature control, are disposed within manifold 120 in order to accomplish this objective. As an alternative to a heater or in addition thereto, a reformer can be provided with thermally conductive structure(s), (e.g., thermally conductive elements 434 of the CPOX reformer illustrated in FIG. 4A) for transferring heat of exotherm recovered from the CPOX reaction occurring within CPOX reaction zones 110 of tubular CPOX reactor units 109 to such locations within the manifold where the potential for condensation of fuel vapor can be greatest, for example, wall surfaces in the vicinity of the fuel-air outlets and/or other sites such as corners and other recesses of the manifold that could cause localized condensation of vaporized fuel.

From manifold 120, the heated CPOX reaction mixture is introduced into tubular CPOX reactor units 109. In a "cold" start-up mode of operation of CPOX reformer 100, igniter 123 initiates the CPOX reaction of the gaseous CPOX reaction mixture within CPOX reaction zones 110 of tubular CPOX reactor units 109 thereby commencing the production of hydrogen-rich reformats. Once steady-state CPOX reaction temperatures have been achieved (e.g., 250° C. to 1,100° C.), the reaction becomes self-sustaining and operation of the igniter can be discontinued. Thermocouples 124 and 125 are provided to monitor the temperatures of, respectively, the vaporization operation occurring within conduit 103 and the CPOX reaction occurring within CPOX reactor units 109, the temperature measurements being relayed as monitored parameters to reformer control system 126.

As further shown in FIG. 1A, in an ambient temperature, or "cold", start-up mode of operation of CPOX reformer in which a second CPOX reaction mixture comprising oxygen-containing gas and gaseous fuel is made to undergo conversion to hydrogen-rich reformate, air introduced by blower 102 into conduit 103 combines with gaseous reformable fuel, exemplified here and in the other embodiments of the present teachings by propane, introduced into conduit 103 at a relatively low pressure from gaseous fuel storage tank 131 through gaseous fuel line 132 equipped with optional thermocouple 133, flow meter 134 and flow control valve 135. Air introduced by blower 102 and propane introduced into conduit 103 through gaseous fuel line 132 into conduit 103 initially combine in mixing zone 136 occupied by static mixer 137 and emerge therefrom as a more uniform propane-air CPOX reaction mixture than would otherwise be the case. The propane-air mixture then enters first heating zone 106 where it is heated to gaseous fuel CPOX reaction temperature by first heater 107, effectively functioning as an igniter for the CPOX reaction mixture, thereby commencing the production of hydrogen-rich reformate. First heating zone 106 may be disposed proximate to gaseous fuel CPOX reaction zone 138 (as shown) or be partly or completely coincident therewith. Gaseous fuel CPOX reaction zone 138 is shown as coincident with heat transfer zone 108. Once a steady-state CPOX reaction temperature has been achieved in CPOX reaction zone 138 (e.g. 250° C. to 1,100° C.), the reaction becomes self-sustaining and operation of first heater 107 can be discontinued.

When CPOX reactor 100 is operated in such manner as to transition from a steady-state mode of liquid fuel CPOX reforming to a "hot" start-up mode of gaseous fuel CPOX reforming, residual heat recovered from CPOX reaction zones 110 of tubular CPOX reactor units 109, with or without the input of additional heat, is transferred to heat transfer zone 108, and therefore CPOX reaction zone 138, where such heat serves to ignite the air-propane mixture commencing the production of hydrogen rich reformate.

Conversely, when CPOX reactor 100 is operated in such manner as to transition from a steady state mode of gaseous fuel CPOX reforming to a "hot" start-up mode of liquid fuel CPOX reforming, residual heat recovered from CPOX reaction zone 138, with or without the input of additional heat, is transferred to air introduced into conduit 103, the heated air then being utilized to vaporize liquid fuel as previously explained in connection with liquid fuel CPOX operation of the reactor, and to preheat CPOX reaction zones 110 of CPOX reactor units 109.

Where, as shown in FIG. 1A, heat transfer zone 108 of CPOX reactor 100 is provided to transfer heat recovered from CPOX reaction taking place within CPOX reaction zones 110 to gas(es) flowing through zone 108, it is within the scope of the present invention to omit gaseous CPOX catalyst 129 and with or without the operation of first heater 107, to process the gaseous fuel-air CPOX reaction mixture in the same tubular CPOX reactor units 109 used for processing a vaporized liquid fuel-air CPOX reaction mixture. In this embodiment of the CPOX reactor (illustrated in FIG. 4B), CPOX reaction zones 110 of tubular CPOX reactor units 109 function as a single, shared or common CPOX reaction zone selectively operable to process liquid or gaseous CPOX fuel.

CPOX reactor 150 illustrated in FIG. 1B is essentially identical to CPOX reactor 100 shown in FIG. 1A except that in the former, gaseous fuel line 132 connects to inlet 160 of duct 161 connecting centrifugal blower units 162 and 163 of centrifugal blower system 164 whereas in the latter, gaseous fuel line 132 connects to inlet 103 at mixing zone 136 occupied by static mixer 137. In the CPOX reactor of FIG. 1B, air drawn into blower unit 162 on being expelled therefrom combines with gaseous fuel introduced through inlet 160 info duct 161, the gaseous fuel-air stream then entering blower unit 163 where it is expelled therefrom as a well-mixed uniform CPOX reaction medium. This arrangement advantageously dispenses with mixing zone 136 and static mixer 137 of CPOX reactor 100 of FIG. 1A while providing perhaps an even more uniform reaction mixture, one formed without an accompanying increase in back pressure.

If desired, product effluent or hydrogen-rich reformate from liquid CPOX reformer 100 can be introduced into one or more conventional or otherwise known carbon monoxide removal devices 128 for the reduction of its carbon monoxide (CO) content, for example, where the product effluent is to be introduced as fuel to a fuel cell stack utilizing a catalyst that is particularly susceptible to poisoning by CO, for example, a polymer electrolyte membrane fuel cell. Thus, for example, the product effluent can be introduced into a water gas shift (WGS) converter wherein CO is converted to carbon dioxide ($CO_2$) while at the same time producing additional hydrogen, or the product effluent can be introduced into a reactor wherein CO is made to undergo preferential oxidation (PROX) to $CO_2$. CO reduction can also be carried out employing a combination of these processes, for example, WGS followed by PROX and vice versa.

It is also within the scope of the present teachings to reduce the level of CO in the product reformate by passage of the product reformate through a known or conventional clean-up unit or device equipped with a hydrogen-selective membrane providing separation of the product reformate into a hydrogen stream and a CO-containing by-product stream. Units/devices of this kind can also be combined with one or more other CG-reduction units such as the aforementioned WGS converter and/or PROX reactor.

Reformer 100 can also include a source of electrical current, for example, rechargeable lithium-ion battery system 127, to provide power for its electrically driven components such as blower 102, flow meters 104 and 115, heaters 107, 112 and 121, liquid fuel pump 113, flow control valves 116 and 135, igniter 123, and thermocouples 105, 122, 124, 125 and 133, and, if desired, to store surplus electricity for later use.

Controller 126 is provided for controlling the operations of a liquid fuel CPOX reformer 100 in its start-up, steady-state and shut-down modes, when operation. The controller can be software operating on a processor. However, it is within the scope of the present teachings to employ a controller that is implemented with one or more digital or analog circuits, or combinations thereof.

Controller 126 further includes a plurality of sensor assemblies, for example, flow meters 104 and 115, thermocouples 105, 122, 124, 125 and 133, and the like, in communication with the controller and adapted to monitor selected operating parameters of CPOX reformer 100.

In response to input signals from the sensor assemblies, user commands from a user-input device and/or programmed subroutines and command sequences, controller 126 can manage the operations of the CPOX reformer in accordance with the present teachings. More specifically, controller 126 can communicate with a control signal-receiving portion of the desired section or component of CPOX reformer 100 by sending command signals thereto directing a particular action. Thus, for example, in response to liquid fuel flow rate input signals from flow meters 104 and 115 and/or temperature input signals from thermocouples 105, 122, 124, 125 and 133, controller 126 can, for example, send control signals to liquid fuel pump 113 and/or liquid fuel flow control valve 116, to control the flow of liquid fuel through fuel line 114 to conduit 103, to centrifugal blower 102 to control the flow of air into conduit 103 and drive the flow of heated gaseous CPOX reaction mixture within and through CPOX reformer units 109, to first and second heater units 107 and 112 to control their thermal output, to manifold heater 121 to control its thermal output, to igniter 123 to control its on-off states, and to battery/battery recharger system 127 to manage its functions. Similarly, in response to gaseous flow rate input signals from flow meter 134 and/or temperature input signals from thermocouple 133, controller 126 can send control signals to gaseous fuel flow control valve 136 to control the flow of gaseous fuel through line 132, to centrifugal blower 102 to control the flow of air into conduit 103, to first and second heater units 107 and 112 and manifold heater 121 to control their on-off states (the off state when reformer 100 is processing gaseous fuel) and igniter 123 to control its on-off state.

The sensor assemblies, control signal-receiving devices and communication pathways herein can be of any suitable construction such as those known in the art. The sensor assemblies can include any suitable sensor devices for the operating parameters being monitored. For example, fuel flow rates can be monitored with any suitable flow meter, pressures can be monitored with any suitable pressure-sensing or pressure-regulating device, and the like. The sensor assemblies can also, but do not necessarily, include a transducer in communication with the controller. The communication pathways will ordinarily be wired electrical signals but any other suitable form of communication path way can also be employed.

In FIG. 1A, communication pathways are schematically illustrated as single- or double-headed arrows. An arrow terminating at controller 126 schematically represents an input signal such as the value of a measured flow rate or measured temperature. An arrow extending from controller 126 schematically represents a control signal sent to direct a responsive action from the component at which the arrow terminates. Dual-headed pathways schematically represent that controller 126 not only sends command signals to corresponding components of CPOX reformer 100 to provide a determined responsive action, but also receives operating inputs from CPOX reformer 100 and various components thereof mechanical units such as fuel pump 113 and carbon monoxide removal device 128.

Figure 2A:
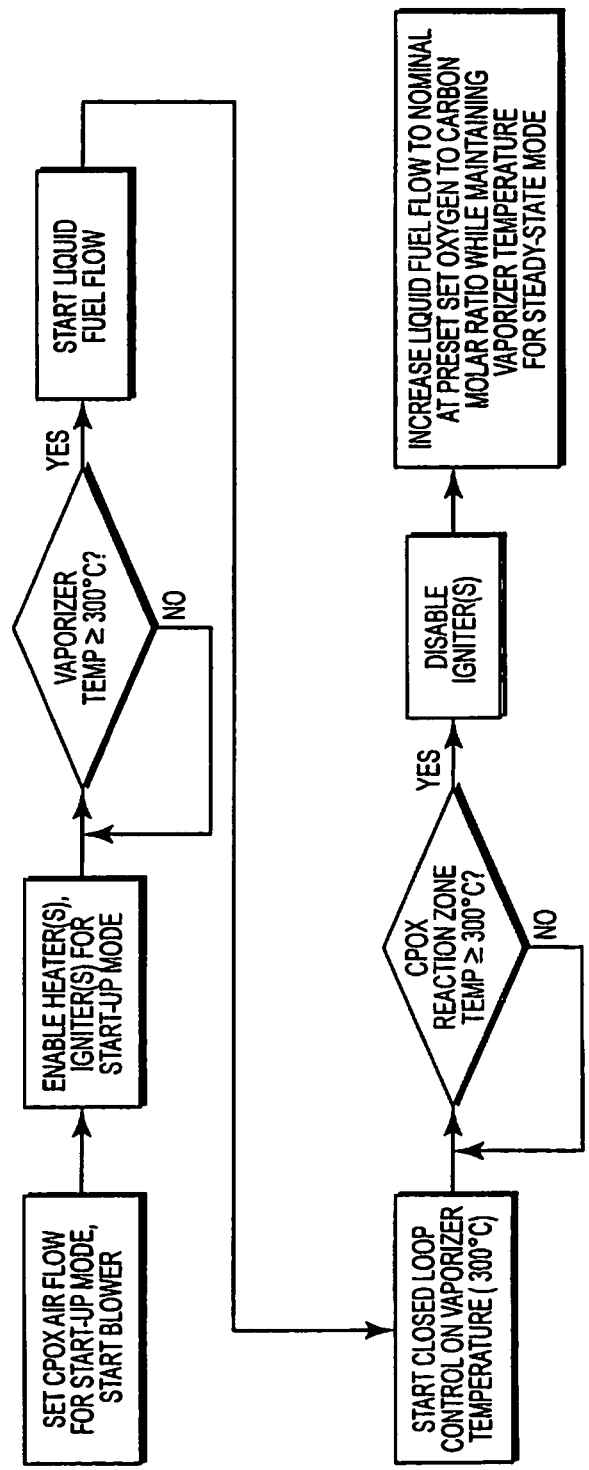
FIGS. 2A and 2B are flowcharts of exemplary control routines executed by a controller such as that illustrated in the embodiments of dual utilization liquid and gaseous fuel reformers of FIGS. 1A and 1B for managing the operation of the reformers for reforming liquid fuel (FIG. 2A) and gaseous fuel (FIG. 2B).
Figure 2B:
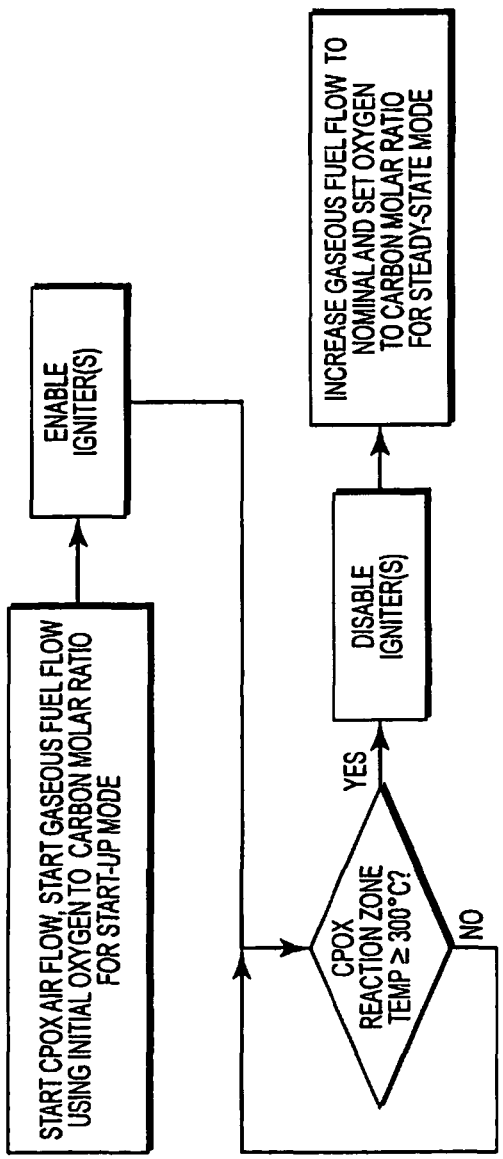
Figure 3A:
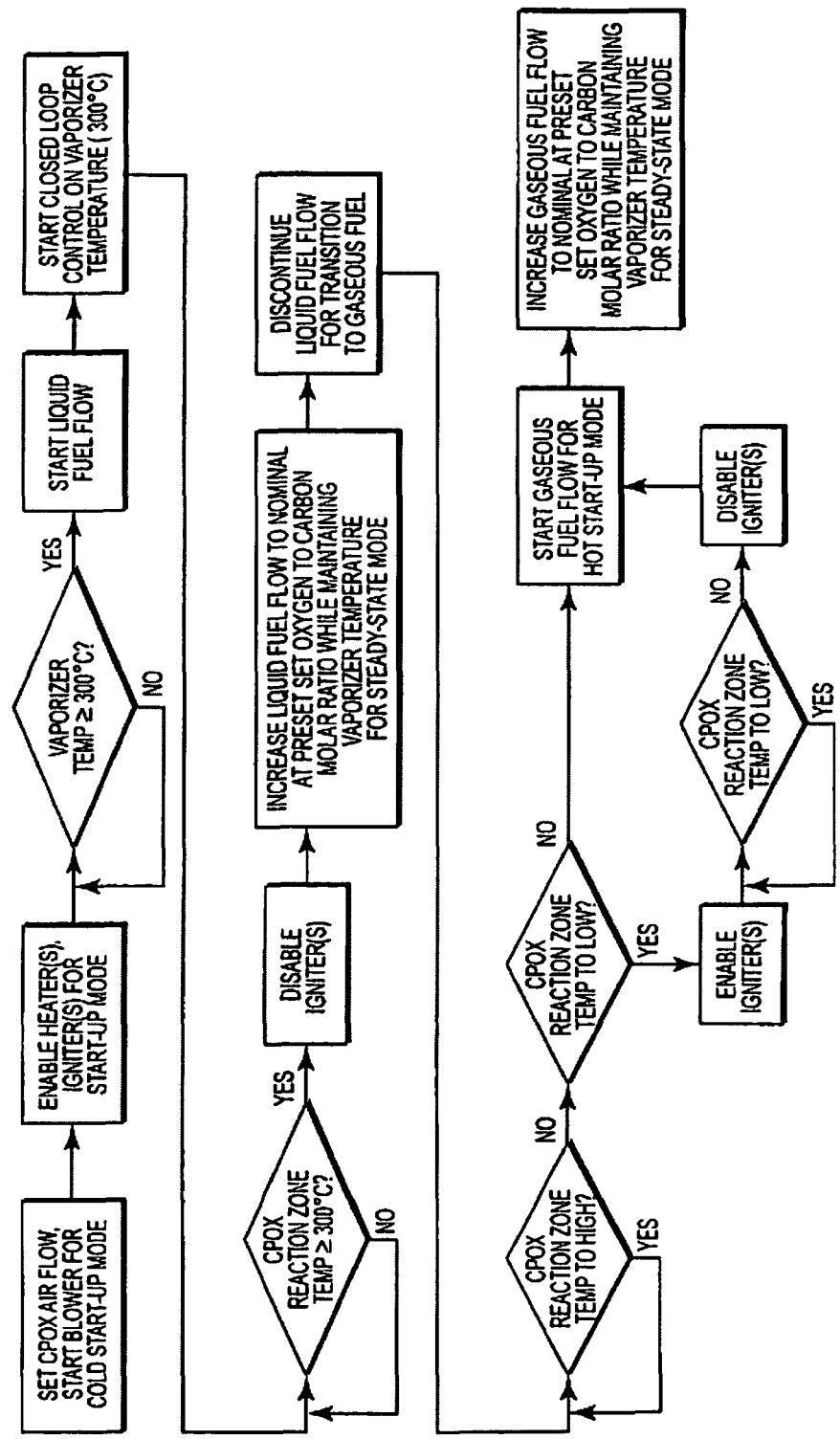
FIGS. 3A and 3B are flowcharts of exemplary control routines executed by a controller such as that illustrated in the embodiments of dual utilization liquid and gaseous fuel reformers of FIGS. 1A and 1B for managing the operation of the reformers when transitioned from reforming liquid fuel to reforming gaseous fuel (FIG. 3A) and when transitioning from reforming gaseous fuel to reforming liquid fuel (FIG. 3B).
Figure 3B:
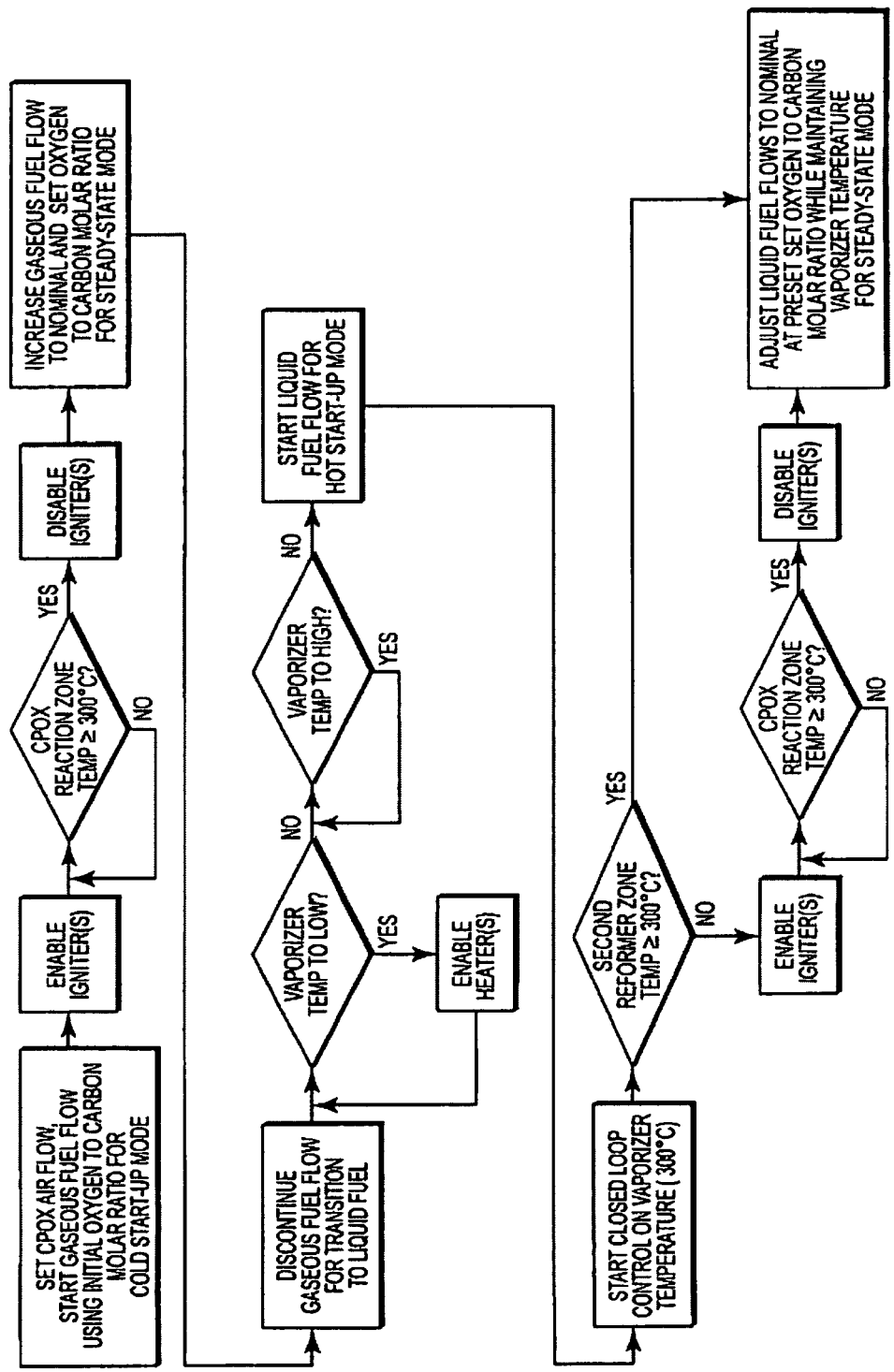

FIGS. 2A and 2B present flow charts of exemplary control routines that can be executed by a controller such as controller 126 of FIGS. 1A and 1B to automate the operations of dual utilization liquid and gaseous fuel CPOX reformer in accordance with the present teachings when, respectively, processing liquid fuel and gaseous fuel in accordance with the present teachings. Similarly, FIGS. 3A and 3B present flow charts of exemplary control routines than can be executed by a controller such as controller 126 of FIGS. 1A and 1B to automate the operations of a CPOX reactor herein when, respectively, made to transition from processing liquid fuel to gaseous fuel (FIG. 3A) and transition from processing gaseous fuel to liquid fuel (FIG. 3B). The flow charts can be executed by a controller at a fixed interval, for example, every 10 milliseconds or so. The control logic illustrated in FIGS. 2A, 2B, 3A and 3B perform several functions including the management of gaseous flows, healing and fuel vaporization in the case of liquid fuel reforming and reforming reaction temperatures in start-up and steady-state modes of operation and management of the procedure for the shut-down mode of reformer operation.

As shown in the various views of exemplary dual utilization liquid and gaseous fuel CPOX reformer 400 illustrated in FIG. 4A, which is further representative of the present teachings, air as an oxygen-containing gas is introduced at ambient temperature and at a preset mass flow rate via centrifugal blower system 402 through inlet 403 of main conduit 404, which includes a generally U-shaped conduit section favoring compactness. The ambient temperature air is initially heated in the start-up mode operation of the reformer to within a preset range of elevated temperature by passage through first heating zone 405 supplied with heat from first heater unit 406. First heater unit 406 and second heater unit 413 downstream therefrom can be of a conventional or otherwise known electrical resistance type rated, for example, at from 10 to 80 watts or even greater depending upon the designed range of liquid fuel processing capacity of the reformer. Such heaters are capable of raising the temperature of ambient air introduced into main conduit 404 to a desired level for a relatively wide range of CPOX reformer configurations and operating capacities. During the steady-state mode of operation of CPOX reformer 400, first heater unit 406 can be shut off, the air introduced into main conduit 404 then being initially heated within heat transfer zone 407 by heal of exotherm recovered from CPOX reaction zones 409 of elongate tubular gas-permeable CPOX reactor units 408. In this manner, the temperature of the air introduced into conduit 404 can be increased from ambient to within some preset elevated range of temperature with the particular temperature being influenced by a variety of design, i.e., structural and operational, factors as those skilled in the art will readily recognize.

Thermal insulation 410, for example, of the microporous or alumina-based refractory type, surrounds most of main conduit 404 and those portions of CPOX reactor units 408 corresponding to their CPOX reaction zones 409 in order to reduce thermal losses from these components.

As the heated air flows downstream within main conduit 404, it can be split, or divided, into two streams with one stream continuing to course through main conduit 404 and the other stream being diverted into branch conduit 411 from which it exits to re-enter main conduit 404 at merger zone 421 there to merge with vaporized fuel-air mixing passing from first mixing zone 420 (having a first static mixer and/or a helically-grooved, internal wall surface disposed therein). The merged gases then enter second mixing zone 422 (similarly having a second static mixture and/or a helically-grooved internal wall surface disposed therein) to provide a gaseous CPOX reaction mixture of fairly uniform composition for introduction through outlet 425 into gas distributor 427 of manifold 426, the structure and operation of which are more fully described herein.

By splitting the total amount of air for the desired CPOX reaction into two streams, the amount of vaporized liquid fuel component contained in the fuel-air mixture that starts to form as just-vaporized fuel and heated air begin to combine can be kept high in proportion to the oxygen content of the air component thus eliminating or reducing the possibility that some region(s) of this non-uniform initial fuel-air mixture will contain a concentration of oxygen that is sufficiently high to support ignition with consequent coke formation. Once the initial fuel-air mixture passes through the first static mixer disposed within a first mixing zone thereby attaining a degree of compositional uniformity that makes the presence of ignition-inducing regions of relatively high oxygen concentration much less likely, the somewhat more uniform fuel-air mixture can then merge with the second heated air stream exiting branch conduit 411 at merger zone 421 thereby satisfying the preset O to C molar ratio of the desired CPOX reaction mixture. This fuel-air mixture can then flow through the second static mixer disposed within second mixing zone 422 to provide a more compositionally uniform gaseous CPOX reaction mixture just prior to the mixture entering gas distributor 427 of manifold 426.

To raise the temperature of the air that had been initially heated by passage through first heating zone 405 and/or heat transfer zone 407, as the initially heated air continues to flow downstream in main conduit 404, it is routed through second heating zone 412 supplied with heat from second heater unit 413. Because second heater unit 413 need only increase the temperature of the initially heated air by a relatively small extent, it can function as an incremental heater capable of making the typically small adjustments in air temperature that are conducive to precise and rapid thermal management of the reformer both with regard to the functioning of its fuel vaporization system, described herein, and its tubular CPOX reactor units 408.

A liquid reformable fuel such as any of those mentioned above, and exemplified in this and the other embodiments of the present teachings by diesel fuel, is introduced via fuel line 414 terminating within main conduit 404 in liquid fuel spreader device 415, for example, wick 416 or spray device (not shown).

Any conventional or otherwise known pump device 418 for introducing liquid fuel to CPOX reformer 400, for example, a metering pump, rotary pump, impeller pump, diaphragm pump, peristaltic pump, positive displacement pump such as a gerotor, gear pump, piezoelectric pump, electrokinetic pump, electroosmotic pump, capillary pump, and the like, can be utilized for this purpose. As indicated above, the pressurized liquid fuel can be spread within main conduit 404 by a wick or as a fine spray or otherwise in droplet form by any of such conventional or otherwise known spray devices as fuel injectors, pressurized nozzles, atomizers (including those of the ultrasonic type), nebulizers, and the like. First and second heater unit 406 and 413 and fuel spreader device 415 can function in unison to vaporize liquid fuel introduced into main conduit 404 and together constitute the principal components of the fuel vaporizer system of reformer 400. In some embodiments, a pump or equivalent device can deliver the fuel on an intermittent or pulsed flow basis or substantially continuous flow. In particular embodiments, a pump or equivalent device can make rapid adjustments in fuel flow rate in response to changing CPOX reformer operating requirements.

Although CPOX reformer 400 can use any source of heat for driving vaporization of the liquid fuel during the start-up mode of operation, for example, a heater of the electrical resistance type (as in the case of heaters 406 and 413), especially where vaporization of the fuel is made to take place outside main conduit 404, the embodiment of liquid CPOX reformer illustrated in FIG. 4A employs heater 413 to not only incrementally raise the temperature of the initially heated ambient temperature air but to heat the liquid fuel prior to its introduction into main conduit 404 and to provide sufficient heat for vaporizing the fuel once it enters the conduit. This optional provision for healing liquid fuel prior to its introduction into main conduit 404 can make it possible to vaporize a given amount of liquid reformable fuel faster, or a greater amount of liquid fuel within a given time period, than the same vaporizer system operating upon reformable fuel which is at ambient temperature at the time it enters conduit 404.

To provide for the heating of the liquid fuel before it enters main conduit 404 and as shown in the vaporizer system, or assembly, illustrated in FIG. 4A, fuel line 414 traverses the wall of main conduit 404 with section 419 of the fuel line being extended in length to prolong the residence time of fuel flowing therein where the fuel line passes through, or is proximate to, second heating zone 412 of main conduit 404. An extended fuel line section can assume a variety of configurations for this purpose, for example, a coiled or helical winding (as shown) or a series of lengthwise folds, disposed on, or proximate to, the exterior surface of main conduit 404 corresponding to second heating zone 412 or any similar such configuration disposed within the interior of the conduit at or near second heating zone 412. Regardless of its exact configuration and/or disposition, extended fuel line section 419 must be in effective heat transfer proximity to second heating zone 412 so as to receive an amount of heat sufficient to raise the temperature of the fuel therein to within some preset range of temperature. Thus, a portion of the thermal output of heater 413 within second heating zone 412 of main conduit 404, in addition to further heating air flowing within this zone, will transfer to fuel, for example, diesel fuel, flowing within the distal section 419 of fuel line 414, which distal section of fuel line 414 can be lengthened or extended as shown by section 419, thereby raising its temperature to within the preset range. Whichever range of temperature values is chosen for the liquid fuel within the fuel line, it should not exceed the boiling point of the fuel (from 150° C. to 350° C. in the case of diesel) if vapor lock and consequent shut-down of reformer 400 are to be avoided.

In the liquid fuel vaporizer described herein, there is little or no opportunity for the liquid fuel to come into direct contact with a heated surface, for example, that of an electrical resistance heater element, that would pose a risk of raising the temperature of the diesel fuel to or above its flash point, to cause spattering of the fuel rather than its vaporization and/or cause pyrolysis of the fuel resulting in coke formation. Thus, in the vaporizer systems illustrated in FIG. 4A, the temperature of the diesel fuel can be readily and reliably maintained at a level below its flash point and without significant incidents of spattering or coking.

Liquid fuel spreader 415 is disposed within main conduit 404 downstream from second heating zone 412 and associated heater 413 and upstream from first mixing zone 420. Thermocouple 423 is disposed within main conduit 404 downstream from the vaporizer in order to monitor the temperature of the vaporized fuel-air mixture beginning to form therein.

Following its passage through the second static mixer disposed within second mixing zone 422, gaseous CPOX reaction mixture exits main conduit 404 through outlet 425 and enters gas distributor 427 of manifold 426 which is configured to provide a more uniform distribution of the reaction mixture to, and within, tubular CPOX reactor units 408. Such an arrangement, or other arrangement within the present teachings can provide a distribution of gaseous CPOX reaction mixture where the difference in flow rate of the gaseous CPOX reaction mixture within any two CPOX reactor units is not greater than about 20 percent, for example, not greater than about 10 percent, or not greater than about 5 percent.

Manifold 426 includes manifold housing, or enclosure, 428 defining manifold chamber 429 within which heated gaseous CPOX reaction mixture (gas) distributor 427 is connected to outlet 425 of main conduit 404. Heated gaseous CPOX reaction mixture exiting main conduit 404 through outlet 425 enters gas distributor 427 thereafter passing outwardly through apertures (e.g., holes or slots) 430 located at the bottom or lower part of the gas distributor, the gas then flowing around the exterior surface of the distributor to its top or upper part and from there into inlets 431 of tubular CPOX reactor units 408.

To eliminate or lessen the possibility that the temperature within some region(s) and/or surface(s) of manifold chamber 429 will fall to or below the condensation temperature of the vaporized liquid reformable fuel of the gaseous CPOX reaction mixture present therein, electrical resistance heater 432 and thermocouple 433 can be disposed within manifold chamber 429, for example, on one or more of its internal surfaces or embedded within one or more of its walls, to provide an active heater system for maintaining the temperature within the chamber above the fuel condensation, temperature. In addition to an active heater system, for example, as described above, or as an alternative thereto, a passive heat transfer system comprising thermally conductive elements 434, for example, fabricated from a good conductor of heat such as copper, thermally linking CPOX reaction zones 409 of tubular CPOX reactor units 408 with manifold chamber 429 can be arranged within reformer 400 to convey heat of exotherm from CPOX reaction zones 409 to regions and/or surfaces within manifold chamber 429 so as to maintain the temperature of the vaporized fuel therein above its condensation temperature.

In addition to their function of preventing or minimizing the occurrence of fuel condensation, such active and/or passive heating systems can serve to make the temperature of the gaseous CPOX reaction mixture more uniform as it is introduced into inlets of CPOX reactor units with consequent benefits for both reformer operation and control. Thus, for example, one or both manifold heating systems can be operated to provide a gaseous CPOX reaction mixture of consistently uniform temperature throughout a manifold chamber such that there will be not more than about a 10% difference, for example, not more than about a 5% difference, in the temperature of gaseous CPOX reaction mixture entering any two tubular CPOX reactor units.

Some specific factors that can bear upon the optimization of the design of manifold 426 for accomplishing its function of promoting a more uniform distribution of gaseous CPOX reaction mixture to CPOX reactor units 408 include the configuration of its housing 428, the volume of its chamber 429 and the dimensions of gas distributor 427 including the number, design and placement of its apertures 430. Such factors in turn depend on such reformer design and operational factors as the target flow rates of gaseous CPOX reaction mixture within a conduit, the number and arrangement of CPOX reactor units 408, the shape and dimensions of inlets 431 of CPOX reactor units 408, and similar considerations. A manifold of optimal fuel-air distribution performance for a particular liquid fuel CPOX reformer in accordance with the present teachings can be readily constructed by those skilled in the art employing routine testing methods.

From manifold 426, heated gaseous CPOX reaction mixture enters inlets 431 of CPOX reactor units 408 and into CPOX reaction zones 409 where the reaction mixture undergoes a gas phase CPOX reaction to produce a hydrogen-rich, carbon monoxide-containing reformate. In the start-up mode, one or more igniters 435 initiates CPOX. After CPOX becomes self-sustaining, for example, when the temperature of the reaction zone reaches from about 250° C. to about 1100° C., the igniter(s) can be shut off as external ignition is no longer required to maintain the now self-sustaining CPOX reaction.

In addition to processing liquid reformable fuels, dual utilization liquid and gaseous fuel reformer 400 includes structural components that enable it to selectively process gaseous reformable fuels, a capability that optimizes fuel management where both types of reformable fuel are available, for example, but not necessarily at the same time, or for facilitating a subsequent hot start-up mode of operation with liquid fuel. This, a relatively brief period of gaseous fuel CPOX reforming can prepare the CPOX reactor for transitioning to a hot start-up mode of liquid fuel CPOX reforming and a quick entry into the steady-state mode of liquid fuel CPOX reforming.

As shown in FIG. 4A, reformer 400 includes gaseous reformable fuel line 441 and gaseous fuel inlet 442 through which a gaseous fuel such as methane or natural gas or propane is introduced into main conduit 404 at a location therein which is downstream from centrifugal blower system 402 and inlet 403 and upstream from static mixer 436 disposed within mixing zone 437. The gaseous fuel combines with the previously introduced ambient temperature air by passing through mixing zone 437, the resulting gaseous fuel-air mixture then passing through first heating zone 405 where it is heated to CPOX reaction temperature and then into CPOX reactor zone 443 (essentially coincident with heat transfer zone 407).

Gas-permeable CPOX catalyst-containing support 444, for example, a close-fitting sleeve, insert, lining or coating provided as a porous refractory metal and/or ceramic material, is disposed within CPOX reactor zone 443 of main conduit 404 and extends for at least part of the length, or the full length, of heat transfer zone 407. The fuel-air mixture, heated within first heating zone 405 during a start-up mode of operation to a temperature sufficient to initiate CPOX, or to a CPOX-initiating temperature within heat transfer zone 407 during a steady-state mode of operation, undergoes CPOX upon contact with CPOX catalyst-containing support 444 to provide hydrogen-rich reformats.

The provision of gas-permeable CPOX catalyst-containing support 444 within heat transfer zone 407 of main conduit 404 allows CPOX reforming of gaseous fuel to proceed therein under the milder temperature conditions that are typical of the more efficient CPOX conversion of gaseous fuels (e.g., from about 600° C. to about 850° C.) in contrast to the higher temperature regimes of the less efficient CPOX conversion of liquid reformable fuels such as diesel (e.g., from about 650° C. to 1,100° C.). Conducting gaseous fuel CPOX reforming-within CPOX catalyst-containing support 444 at the aforementioned lower temperatures has the considerable advantage of reducing the risk of cracking of the fuel and consequent coke formation on the surfaces of the (main) conduit and CPOX reactor units. Such events would be more likely to occur and lead to CPOX reformer failure were the gaseous fuel to be added directly to a CPOX reaction zone with or following the introduction of vaporized fuel-air mixtures therein. Therefore, the CPOX reformers herein, transitioning from the sole processing of gaseous fuel and back again following a period of liquid reformable fuel CPOX conversion can be readily and smoothly accomplished without risk to the integrity of the CPOX reformer and its proper functioning.

An open gaseous flow passageway can allow for the substantially unimpeded flow of gaseous CPOX reaction mixture and hydrogen-containing reformate therein, a structural feature of CPOX reactor units of the present teachings that contributes to the low back pressure which is characteristic of the operation of liquid fuel CPOX reformers of the present teachings. In the operation of a liquid fuel CPOX reformer in accordance with the present teachings, back pressures of not more than about 3 inches of water (0.0075 bar), for example, not more than about 2 inches of water, or not more than about 1 inch of water, are readily achievable.

As previously mentioned, to prevent or inhibit the loss of hydrogen by diffusion through and beyond a gas-permeable wall of tubular CPOX reactor unit 408, a hydrogen barrier is advantageously attached to an outer surface of the wall for at least that portion of its length corresponding to CPOX reaction zone 409. Materials capable of functioning as effective hydrogen barriers must be thermally stable at the high temperatures typical of CPOX reactions and sufficiently dense so as to prevent or deter permeation or diffusion of reformate gases, particularly hydrogen, beyond the external surface of the all corresponding to CPOX reaction zone 409.

A variety of ceramic materials (inclusive of glasses and glass-ceramics) and metals meeting these requirements are known and are therefore suitable for providing the hydrogen barrier. Specific materials for the hydrogen barrier include, for example, aluminum, nickel, molybdenum, tin, chromium, alumina, recrystallized alumina, aluminides, alumino-silicates, titania, titanium carbide, titanium nitride, boron nitride, magnesium, oxide, chromium oxide, zirconium phosphate, ceria, zirconia, mulite and the like, admixtures thereof and layered combinations thereof.

Materials from which the catalytically active wall structure of a CPOX reaction zone of a tubular CPOX reactor unit can be fabricated are those that enable such wall structures to remain stable under the high temperatures and oxidative environments characteristic of CPOX reactions. Conventional and otherwise known refractory metals, refractory ceramics, and combinations thereof can be used for the construction of the catalytically active wall structure of a CPOX reaction zone. Some of these materials, for example, perovskites, can also possess catalytic activity impartial oxidation and therefore can be useful not only for the fabrication of the catatytically active wall structure of a CPOX reaction zone but can also supply part or even all of the CPOX catalyst for such structure.

Among the many known and conventional CPOX catalysts that can be utilized herein are the metals, metal alloys, metal oxides, mixed metal oxides, perovskites, pyrochlores, their mixtures and combinations, including various ones of which are disclosed, for example, in U.S. Pat. Nos. 5,149,156; 5,447,705; 6,379,586; 6,402,989; 6,458,334; 6,488,907; 6,702,960; 6,726,853; 6,878,667; 7,070,752; 7,090,826; 7,328,691; 7,585,810; 7,888,278; 8,062,800; and, 8,241,600, the entire contents of which are incorporated by reference herein.

While numerous highly active noble metal-containing CPOX catalysts are known and as such can be useful herein, they are generally less often employed than other known types of CPOX catalysts due to their high cost, their tendency to sinter at high temperatures and consequently undergo a reduction in catalytic activity, and their proneness to poisoning by sulfur.

Perovskite catalysts are a class of CPOX catalyst useful in the present teachings as they are also suitable for the construction of the catalytically active wall structures of a CPOX reactor unit. Perovskite catalysts are characterized by the structure $ABX_3$ where "A" and "B" are cations of very different sizes and "X" is an anion, generally oxygen, that bonds to both cations. Examples of suitable perovskite CPOX catalysts include $LaNiO_3$, $LaCoO_3$, $LaCrO_3$, $LaFeO_3$ and $LaMnO_3$.

A-site modification of the perovskites generally affects their thermal stability while B-site modification generally affects their catalytic activity. Perovskites can be tailor-modified for particular CPOX reaction conditions by doping at their A and/or B sites. Doping results in the atomic level dispersion of the active dopant within the perovskite lattice thereby inhibiting degradations in their catalytic performance. Perovskites can also exhibit excellent tolerance to sulfur at high temperatures characteristic of CPOX reforming. Examples of doped perovskites useful as CPOX catalysts include $La_{1-x}Ce_xFeO_3$, $LaCr_{1-y}Ru_yO_3$, $La_{1-x}Sr_xAl_{1-y}Ru_yO_3$ and $La_{1-x}Sr_xFeO_3$ wherein x and y are numbers ranging, for example, from 0.01 to 0.5, from 0.05 to 0.2, etc., depending on the solubility limit and cost of the dopants.

Alternatively or in combination with the connection of the outlet of the CPOX reformer, the outlets of two or more CPOX reactor units of a multitubular CPOX reformer can be in fluid communication with each other (and with additional outlets of CPOX reactor units) and the hydrogen-rich reformate from the outlets can be combined prior to introduction into a fuel cell. For example, the hydrogen-rich reformate effluent from two or more CPOX reactor units can be combined in a manifold or similar device and/or one or more conduits and then introduced into a fuel cell, which can be a multitubular fuel cell or a single fuel cell unit. Accordingly, a CPOX reformer of the present teachings can be adapted to various applications depending on its end use, for example, providing hydrogen-rich reformate to a single or multitubular fuel cell unit.

Multiple centrifugal blower systems 152 of CPOX reformer 150 shown in FIG. 1B and 501 of CPOX reformer 500 shown in FIG. 4B. Among its other advantages, a multiple centrifugal blower system of this construction possesses the ability to make rapid adjustments in the volume of air introduced into a conduit and/or in the rate of flow of the gaseous fuel-air mixture to CPOX reactor units in response to changes in the demand for product hydrogen-rich reformate that single centrifugal blowers of comparable air flow capacity are incapable of providing, as explained herein, without resorting to blowers of relatively high power consumption.

Figure 5:
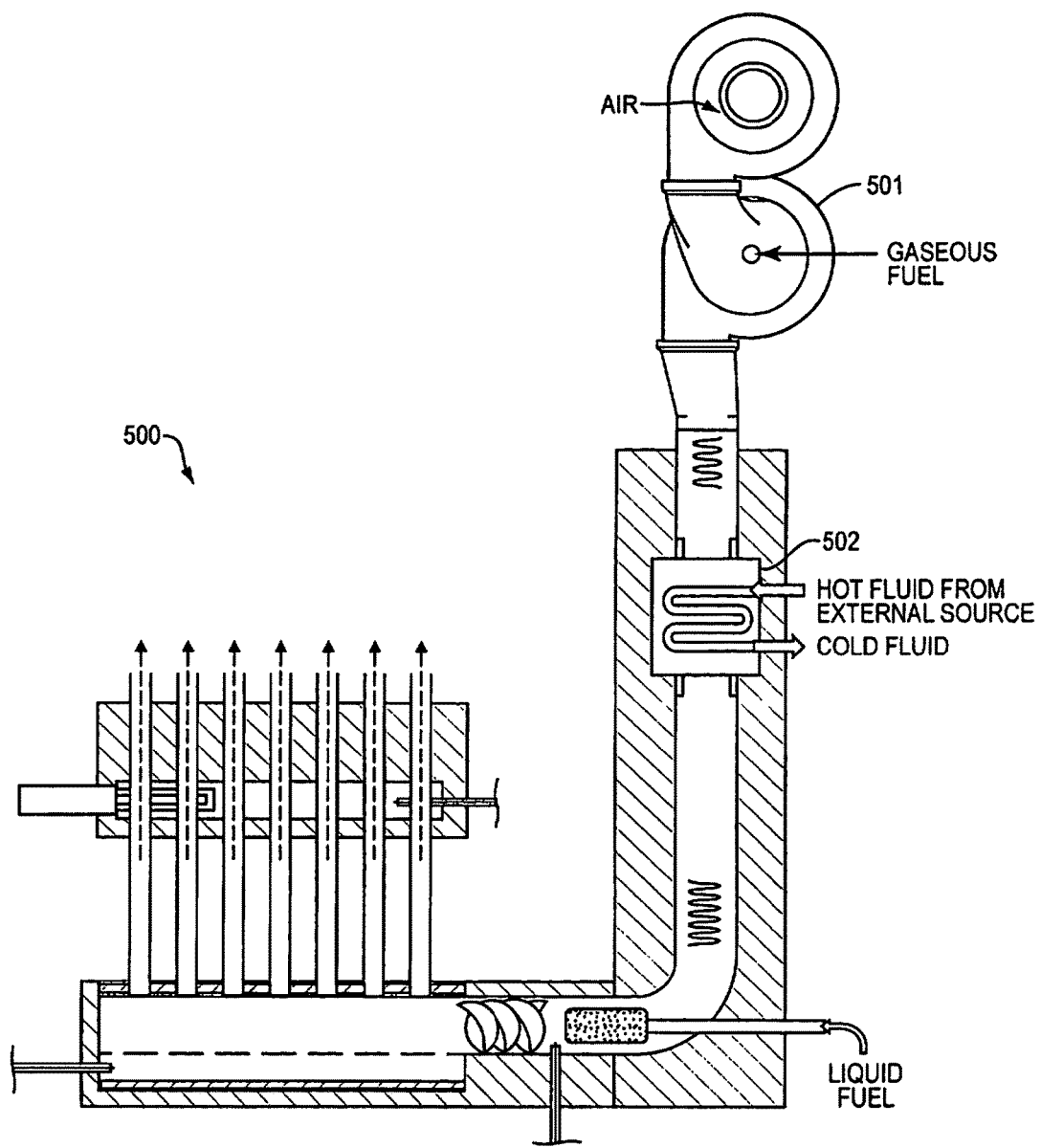
FIG. 5 is longitudinal cross section view of another embodiment of CPOX reformer in accordance with the present teachings featuring the use of heat recovered from an eternal heat source in the operation of the reformer.

CPOX reformer 500 of FIG. 5 differs from CPOX reformer 400 of FIG. 4A primarily in the manner in which the air component and/or liquid reformable fuel component of the gaseous CPOX reaction mixture are heated during the steady-state mode of operation of the reformer. In CPOX reformer 500, a pressurized flow of ambient temperature air provided by centrifugal blower system 501 is introduced into, and passes through, heat exchanger 502 through which is circulated a flow of heat exchange fluid, for example, hot gases from an external heat-producing source such as the afterburner section of a fuel cell stack (not shown). This arrangement differs from the provision for heating air in CPOX reformer 400 of FIG. 4A in which ambient air entering the reformer during the steady-state mode of operation of the reformer passes through heat transfer zone 407 of main conduit 404, the air being heated within zone 407 by heat recovered from the exotherm of the CPOX reaction occurring within CPOX reaction zones 409 of CPOX reactor units 408. In addition, in contrast to the fuel heating system shown in FIG. 4A in which fuel flowing within fuel line section 414 is heated by heater 413, in CPOX reformer 500, a section of fuel line can be routed through heat exchanger 502 to similarly provide heating of the fuel prior to its vaporization. In all other respects, CPOX reformer 500 can operate in essentially the same way as CPOX reformer 400.

Figure 6A:
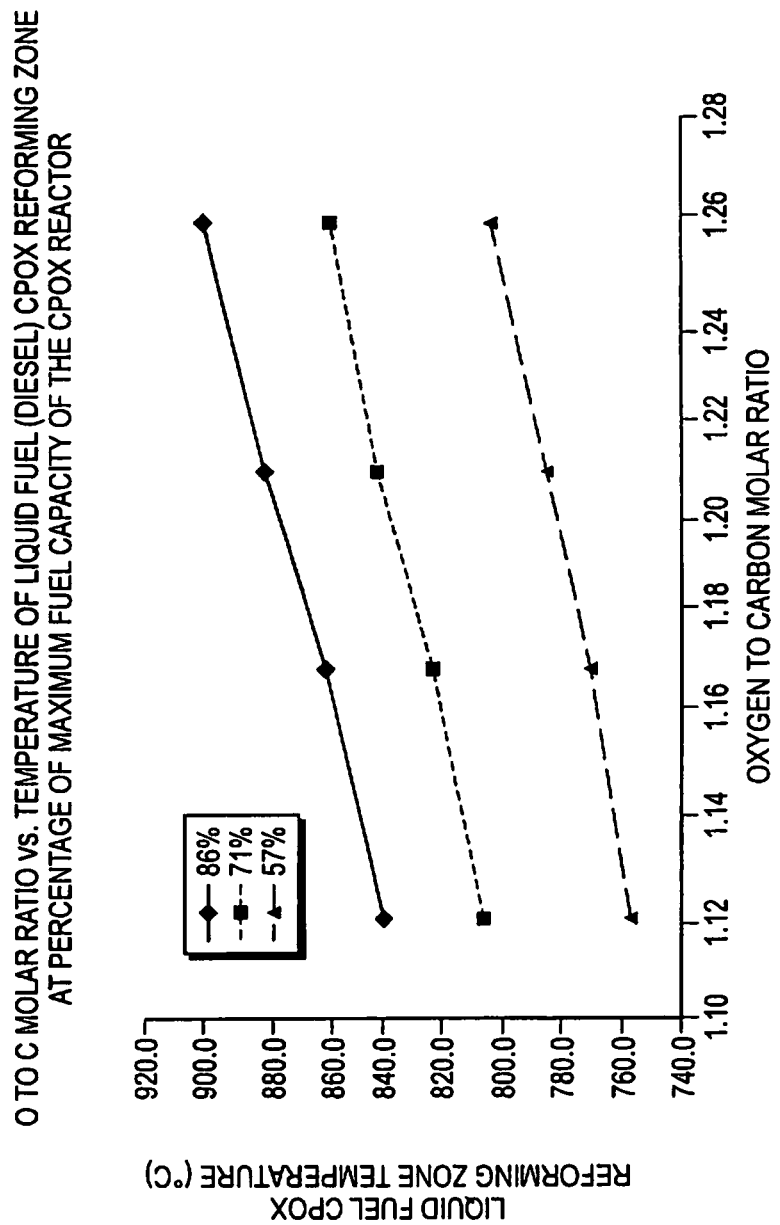
FIGS. 6A and 6B present graphical data showing the relationship between the molar ratios of oxygen to carbon of liquid fuel (diesel) and gaseous fuel (propane) reforming reaction mixtures within the respective liquid fuel and gaseous fuel reforming reaction zone(s) of the dual utilization gaseous and liquid, fuel CPOX reformer of the present teachings at varying percentages of maximum fuel conversion capacity when the reformer is operating in a steady-state mode.
Figure 6B:
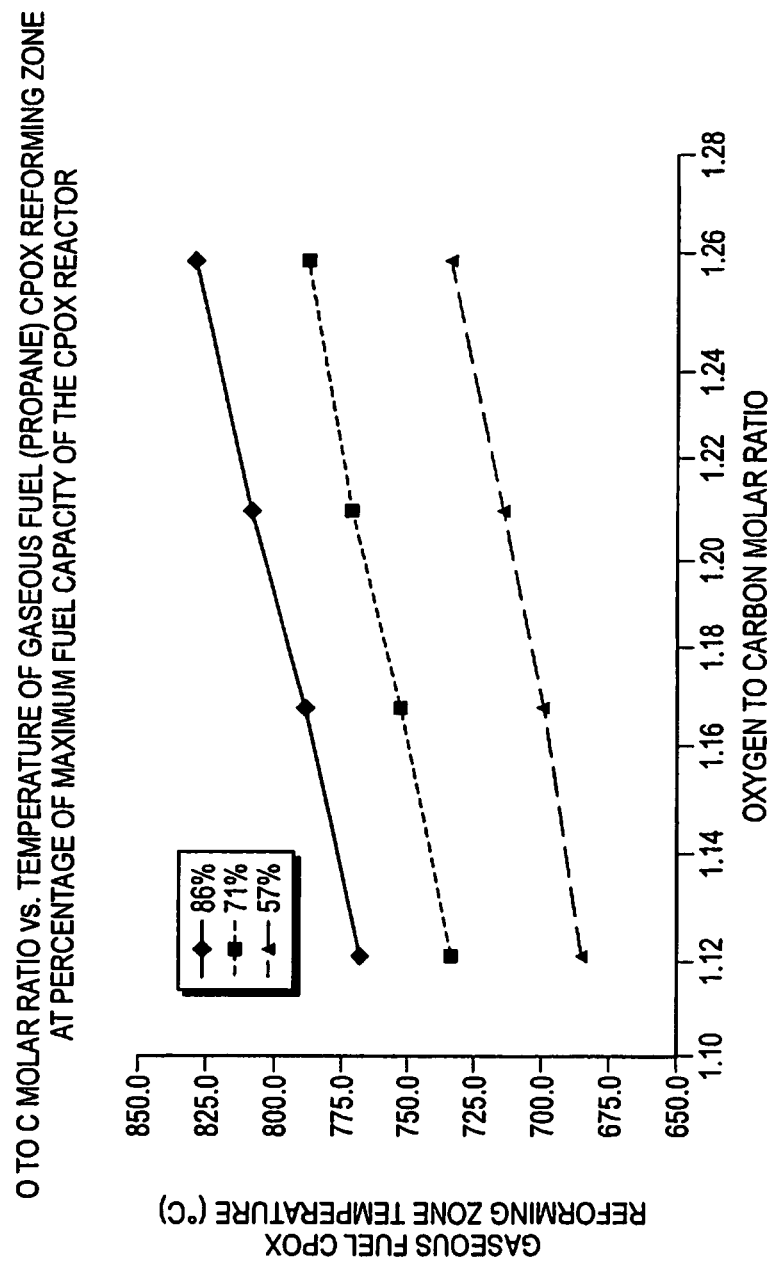

FIGS. 6A and 6B present graphical data demonstrating the relationship between the oxygen (O) to carbon (C) molar ratio of vaporized diesel fuel-air CPOX reaction mixtures and CPOX reaction temperature. As the data show, as the O to C molar ratio of the CPOX reaction mixture is gradually reduced, i.e., as the reaction mixture is adjusted from a relatively carbon-lean one to a relatively carbon-rich one, CPOX reaction temperature declines. These data hold several implications for optimized operations of the dual utilization liquid and gaseous fuel CPOX reformer in accordance with the present teachings.

To promote rapid heating of CPOX catalyst and, consequently, the onset of the gaseous phase CPOX reaction, gaseous CPOX reaction mixtures having higher O to C molar ratios (i.e., fuel-lean reaction mixtures) can be utilized during the start-up mode of operation of the reformer. The higher operating temperatures associated with fuel-lean CPOX reaction mixtures can facilitate a more rapid increase in CPOX catalyst temperature and reduced time to steady-state operation. Additionally, a fuel-lean ratio tends to help inhibit coke formation before the CPOX catalyst has attained its optimum temperature and become fully activated. Once the CPOX catalyst has reached a temperature of about 650° C. and above, the O to C molar ratio can be reduced as fuel flow is increased. Reducing the O to C molar ratio lowers the catalyst temperature and can enable more fuel to be processed without losing thermal control of the CPOX reactor units and in turn, the fuel vaporizer unit. The opposite action can be taken for the shut-down operation, i.e., fuel flow is reduced at a maintained O to C molar ratio. As the temperature of the CPOX reaction zone(s) of the reformer begin to approach or fall below a temperature resulting in coke formation, for example, below about 650° C, the O to C molar ratio can be increased to prevent or minimize coking as the CPOX catalyst deactivates. Typically, the CPOX reformer can be shut down when the temperature of the CPOX reaction mixture falls below about 500° C. The flow of oxygen-containing gas can be continued for up to about 15 to 20 seconds or so after fuel flow has been discontinued. Such a shut-down procedure can allow for vaporization and removal of fuel from the reformer that can be contained within a conduit or a section of fuel line between a fuel control valve and locus of introduction of the fuel into the conduit. This control characteristic can be influenced by various reformer components including the particular vaporizer system and controller unit components utilized in a specific reformer design.

The O to C molar ratio of the fuel-air CPOX reaction mixture can be controlled during the operation to tailor its output thermal conditions, with the understanding that changing the O to C molar ratio can result in changes to the quality and/or composition of the reformate. There is a range of O to C molar ratio that shifts from fuel-lean to fuel-rich as CPOX temperature increases above about 650° C. Different CPOX catalysts can affect the operational windows and CPOX temperatures. Additionally, different fuels (gaseous or liquid) can change the CPOX temperatures depending upon the efficiency of the reforming reactions.

Those skilled in the art, taking into account the various embodiments of the liquid fuel CPOX reformers described herein and the principles of operation of the same, by employing routine experimental procedures can readily optimize the design of a particular reformer of desired liquid reformable fuel conversion capacity, structural characteristics and mechanical properties in accordance with the present teachings.

Further in accordance with the present teachings, steam can be introduced into the reformer so that the reformer may be operated to carry out autothermal and/or steam reforming reaction(s).

In one embodiment, the reformer can be initially operated to perform CPOX conversion of a liquid or gaseous reformable fuel thereby providing heat of exotherm that, with or without additional heat, for example, supplied by an electric heater, can be recovered to produce steam in a steam generator. The thus-generated steam can be introduced into the reformer in one or more locations therein. One suitable location is the vaporizer where the steam can provide heat to vaporize liquid fuel. For example, steam introduced into wick 415 in reformer 400 illustrated in FIG. 4 can provide heat for vaporizing liquid fuel on wick surfaces at the same time helping to eliminate or suppress clogging of such surfaces.

In another embodiment, a reformer in accordance with the present teachings can be connected to a fuel cell stack in which hydrogen-rich reformate from the reformer is converted to electrical current. Operation of the fuel cell stack, and where present an associated afterburner unit, can provide source(s) of waste heat that can be recovered and utilized for the operation of a steam generator, again, with or without additional heat such as that supplied by an electric heater. The steam from the steam generator can then be introduced into the reformer, for example, through wick 415 of reformer 400 of FIG. 4, to support autothermal or steam reforming. In this arrangement of integrated reformer and fuel cell stack, the source(s) of waste heat referred to can supply the necessary heat to drive endothermic reaction(s) that are involved in autothermal and steam reforming processes.

In sum, it should be understood that the delivery systems of the present teachings can deliver the appropriate reactants for carrying out reforming reactions including partial oxidation ("POX") reforming such as catalytic partial oxidation ("CPOX") reforming, steam reforming, and autothermal ("AT") reforming. The liquid reactants such as liquid reformable fuels and water can be delivered from and through the "liquid reformable fuel" delivery components, conduits, and assemblies of the delivery system. The gaseous reactants such as gaseous reformable fuels, steam, and an oxygen-containing gas such as air can be delivered from and through the "gaseous reformable fuel" delivery components, conduits, and assemblies of the delivery system. Certain gaseous reactants such as steam and an oxygen-containing gas can be delivered from and through components and assemblies that are peripheral or secondary to the delivery systems of the present teachings, for example, an oxygen-containing gas can be delivered from a source of oxygen-containing gas that is independently in operable fluid communication with at least one of a vaporizer, a reformer, and a fuel cell stack of a fuel cell unit or system, for example, to mix with a liquid reformable fuel and/or a vaporized liquid reformable fuel prior to reforming.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing, description, and all changes that come within the meaning and range of equivalency of the claims are intended to be embraced therein.

The invention claimed is:
1. A dual utilization liquid and gaseous fuel reformer, which comprises:
    a first reaction zone adapted to be a vaporized liquid fuel or a gaseous fuel gas phase reforming reaction zone;
    a second reaction zone, physically separate from the first reaction zone, adapted to be a gaseous fuel gas phase reforming reaction zone;
    a liquid fuel inlet sized, configured and adapted to receive and transmit a fuel in a liquid phase, the liquid fuel being in a liquid phase at standard temperature and pressure conditions,
    a liquid fuel vaporizer in fluid communication with and downstream from the liquid fuel inlet, adapted to vaporize the liquid fuel transmitted from the liquid fuel inlet,
    a gas flow conduit comprising:
        an oxygen-containing gas inlet sized, configured and adapted to receive and transmit an oxygen containing gas into the gas flow conduit,
        a vaporized liquid fuel inlet in fluid communication with and downstream from the liquid fuel vaporizer, positioned downstream from the oxygen-containing gas inlet and configured and adapted to receive the vaporized liquid fuel from the liquid fuel vaporizer and transmit the vaporized liquid fuel into the gas flow conduit,
        (i) a gaseous fuel inlet, separate from the vaporized liquid fuel inlet, configured and adapted to receive and transmit a gaseous fuel in the gas phase into the conduit, the gaseous fuel being in a gas phase at standard temperature and pressure conditions, the gaseous fuel inlet positioned downstream from the oxygen-containing gas inlet or (ii) a gaseous fuel reforming reaction mixture inlet, the gaseous fuel reforming reaction mixture inlet configured and adapted to receive and transmit into the conduit, a gas phase mixture of an oxygen-containing gas and a gaseous fuel being in a gas phase at standard temperature and pressure conditions, the gaseous fuel inlet or the gaseous fuel reforming reaction mixture inlet being positioned downstream from the oxygen-containing gas inlet,
    a first heating zone of the conduit, thermally coupled to a first heater and positioned to increase the temperature of the conduit contents at a location downstream from the oxygen-containing gas inlet,
    a second heating zone thermally coupled to an internal and/or external source of heat and positioned to increase the temperature of the conduit contents at a location downstream from the oxygen-containing gas inlet, and
    a gaseous reforming reaction mixture outlet adapted for transmitting a gaseous reforming reaction mixture, in gas-flow communication with the liquid fuel reforming reaction zone and the gaseous fuel reforming reaction zone, the gaseous reforming reaction mixture including a vaporized liquid reformable fuel, a gaseous reformable fuel or combinations thereof, and the oxygen-containing gas;
    a gaseous reforming reaction mixture igniter system in thermal communication with each of the liquid and gaseous fuel reforming reaction zones; and, a hydrogen-rich reformate outlet in downstream fluid communication with the liquid fuel gas phase reforming reaction zone.

2. The reformer of claim 1 which further comprises a third heating zone located downstream from the second reaction zone, thermally coupled to a second heater adapted and positioned to increase the temperature of the conduit contents at the third heating zone.

3. The reformer of claim 2 wherein the first and second heaters are electric heaters.

4. The reformer of claim 2 wherein the first and second heaters are electrical resistance heaters.

5. The reformer of claim 1 wherein the second heating zone is thermally coupled to the first reaction zone.

6. The reformer of claim 1 wherein the second heating zone is thermally coupled to at least one external source of heat selected from the group consisting of a fuel cell and a fuel cell afterburner.

7. The reformer of claim 1 wherein an oxygen-containing gas inlet and a gaseous fuel inlet together form a gaseous fuel reforming reaction mixture inlet.

8. The reformer of claim 1 wherein the liquid fuel and gaseous fuel reforming reaction zones together form a common liquid fuel and gaseous fuel reforming reaction zone.

9. The reformer of claim 1 wherein the gaseous reforming reaction mixture outlet of the conduit is in gas-flow communication with the liquid fuel reforming reaction zone and the gaseous fuel reforming reaction zone is disposed with the conduit proximate to, or at least in part coincident with, the second heating zone.

10. The reformer of claim 1, comprising a third heating zone, wherein the gas flow conduit comprises upstream and downstream sections and disposed within the conduit from the upstream to downstream sections, in order, are the oxygen gas-containing inlet, gaseous fuel inlet or oxygen-containing gas and gaseous fuel reforming reaction mixture inlet, first heating zone, second heating zone, third heating zone, liquid fuel vaporizer, and gaseous reforming reaction mixture outlet.

11. The reformer of claim 1, comprising a third heating zone, wherein the gas flow conduit comprises upstream and downstream sections and disposed therein from the upstream to downstream sections, in order, are the oxygen gas-containing inlet, first heating zone, second heating zone, third heating zone, liquid fuel vaporizer, gaseous fuel inlet or oxygen-containing gas and gaseous fuel inlet, and gaseous reforming reaction mixture outlet.

12. The reformer of claim 9, comprising a third heating zone, wherein the gas flow conduit comprises upstream and downstream sections and disposed within the conduit from its upstream to downstream sections, in order, are the oxygen-containing gas inlet, gaseous fuel inlet or oxygen-containing gas and gaseous fuel reforming reaction mixture inlet, gaseous fuel reforming reaction zone proximate to, or at least in part coincident with, the second heating zone, third heating zone, liquid fuel inlet, liquid fuel vaporizer, and gaseous reforming reaction mixture outlet.

13. The reformer of claim 8, comprising a third heating zone, wherein the gas flow conduit comprises upstream and downstream sections and disposed within the conduit from its upstream to downstream sections, in order, are the oxygen gas-containing inlet, gaseous fuel inlet or oxygen-containing gas and gaseous fuel reforming reaction mixture inlet, first heating zone, second heating zone, third heating zone, liquid fuel vaporizer, and gaseous reforming reaction mixture outlet in gas flow communication with the common liquid fuel and gaseous fuel reforming reaction zone.

14. The reformer of claim 8, comprising a third heating zone, wherein the gas flow conduit comprises upstream and downstream sections and disposed within the conduit from its upstream to downstream sections, in order, are the oxygen gas-containing inlet, first heating zone, second heating zone, third heating zone, liquid fuel vaporizer, gaseous fuel inlet or oxygen-containing gas and gaseous fuel reforming reaction mixture inlet, and gaseous reforming reaction mixture outlet in gas flow communication with the common liquid fuel and gaseous fuel reforming reaction zone.

15. The reformer of claim 1 wherein the first reaction zone and the second reaction zone contain a CPOX catalyst.

16. The reformer of claim 1 comprising a controller.

17. The reformer of claim 1, wherein the gaseous reforming reaction mixture igniter system includes a first igniter in thermal communication with the liquid fuel reforming reaction zone and a second igniter in thermal communication with the gaseous fuel reforming reaction zone.

18. A dual utilization liquid and gaseous fuel reformer, which comprises:
   a conduit having a gas inlet adapted to receive and transmit an oxygen containing gas and a gaseous fuel in the gas phase;
   a first reaction zone containing a CPOX catalyst in the conduit, downstream from the gas inlet;
   a first electric heater adapted to heat the oxygen containing gas and gaseous fuel flowing through the conduit;
   a liquid fuel inlet adapted to receive and transmit liquid fuel in the liquid phase and a vaporizer in communication with the liquid fuel inlet, the vaporizer adapted and arranged to vaporize the liquid phase liquid fuel and transmit the vaporized liquid fuel into the conduit;
   a gaseous fuel reaction zone containing a CPOX catalyst downstream from the gas inlet;
   a gas/liquid fuel reaction zone separate from the gaseous fuel reaction zone, containing a CPOX catalyst, located downstream from the gaseous fuel reaction zone and the vaporizer, adapted to react vaporized liquid fuel or gaseous fuel and oxygen containing gas;
   a gaseous reforming reaction mixture outlet of the conduit, downstream from the vaporizer, adapted for receiving and transmitting a gas phase reforming reaction mixture to the second reaction zone, the gas phase reforming reaction mixture including a vaporized liquid reformable fuel, a gaseous reformable fuel or combinations thereof, and the oxygen containing gas;
   a gaseous reforming reaction mixture igniter system in thermal communication with each of the first and the second reforming reaction zones; and
   a hydrogen-rich reformate outlet in downstream fluid communication with the second reforming reaction zone.

19. The dual utilization liquid and gaseous fuel reformer of claim 18, comprising a heat transfer source located at the gaseous fuel reaction zone and adapted to raise the temperature of the conduit contents at the gaseous fuel reaction zone.

20. The dual utilization liquid and gaseous fuel reformer of claim 19, comprising a downstream heater located downstream from the gaseous fuel reaction zone, adapted to heat the contents of the conduit downstream from the gaseous fuel reaction zone.

21. The dual utilization liquid and gaseous fuel reformer of claim 20, wherein the heat transfer source is adapted to use heat of reaction from the gas/liquid fuel reaction zone as the heat source and the downstream heater includes an electric resistance heater.

\* \* \* \* \*